United States Patent
Simard et al.

(10) Patent No.: US 6,940,826 B1
(45) Date of Patent: Sep. 6, 2005

(54) APPARATUS AND METHOD FOR PACKET-BASED MEDIA COMMUNICATIONS

(75) Inventors: Frederic F. Simard, Nepean (CA); Philip K. Edholm, Fremont, CA (US); Nina K. Burns, Columbia, MD (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/475,047

(22) Filed: Dec. 30, 1999

(51) Int. Cl.$^7$ .......................... H04L 12/16; H04M 3/42
(52) U.S. Cl. ................ 370/260; 379/202.01; 455/416; 370/521
(58) Field of Search .............................. 370/260–271, 370/259, 477, 521; 455/416, 417; 379/201.01, 379/202.01, 157–159; 375/240, 240.01

(56) References Cited

U.S. PATENT DOCUMENTS

| | | | |
|---|---|---|---|
| 4,360,910 A | 11/1982 | Segal et al. | |
| 4,387,457 A | 6/1983 | Munter | |
| 5,436,896 A * | 7/1995 | Anderson et al. | 370/260 |
| 5,483,588 A * | 1/1996 | Eaton et al. | 379/202.01 |
| 5,596,635 A | 1/1997 | Rao | |
| 5,751,338 A * | 5/1998 | Ludwig, Jr. | 348/14.12 |
| 5,768,263 A * | 6/1998 | Tischler et al. | 370/263 |
| 5,844,600 A * | 12/1998 | Kerr | 348/14.12 |
| 5,845,243 A * | 12/1998 | Smart et al. | 704/200.1 |
| 5,848,098 A * | 12/1998 | Cheng et al. | 375/220 |
| 5,983,192 A * | 11/1999 | Botzko et al. | 704/500 |
| 6,078,809 A * | 6/2000 | Proctor | 455/416 |
| 6,212,547 B1 * | 4/2001 | Ludwig et al. | 709/204 |
| 6,466,550 B1 * | 10/2002 | Foster et al. | 370/261 |
| 6,522,633 B1 * | 2/2003 | Strawczynski | 370/260 |
| 6,577,622 B1 * | 6/2003 | Schuster et al. | 370/352 |
| 6,584,077 B1 * | 6/2003 | Polomski | 370/263 |
| 6,757,259 B1 * | 6/2004 | Hamilton | 370/260 |

FOREIGN PATENT DOCUMENTS

| | | |
|---|---|---|
| DE | 3206914 | 2/1982 |
| EP | 0301957 | 7/1988 |

OTHER PUBLICATIONS

Network Working Group, RTP: A Transport for Real-Time Applications, Jan. 1996, pp. 1-75.

(Continued)

*Primary Examiner*—Ajit Patel
(74) *Attorney, Agent, or Firm*—Jeffrey M. Measures; Borden Ladner Gervais LLP

(57) ABSTRACT

Packet-based central conference bridges, packet-based network interfaces and packet-based terminals are used for voice communications over a packet-based network. Modifications to these apparatuses can reduce the latency and the signal processing requirements while increasing the signal quality within a voice conference as well as point-to-point communications. For instance, by selecting the talkers prior to the decompression of the voice signals, decreases in the latency and increases in signal quality within the voice conference can result due to a possible removal of the decompression and subsequent compression operations in a conference bridge unnecessary in some circumstances. Further, the removal of the jitter buffers within the conference bridges and the moving of the mixing operation to the individual terminals and/or network interfaces are modifications that can cause lower latency and transcoding within the voice conference.

100 Claims, 16 Drawing Sheets

OTHER PUBLICATIONS

Lipstream Networks, Inc., Fact Sheet, downloaded on Aug. 16, 1999 from web page: http://www.lipstream.com/press/factsheet.html, pp. 1-2.

Lipstream Networks, Inc., Voice by Lipstream Product Specifications and Features, downloaded on Aug. 16, 1999 from web page: http://www.lipstream.com/press/specsheet.html, pp. 1.

Lipstream Networks, Inc., Pressroom, downloaded on Aug. 16, 1999 from web page: http://www.lipstream.com/pressroom.html, pp. 1.

G. Weiss, C. Ziegler; "A Comparative Analysis of Implementation Mechanisms for Packet VoiceConferencing" CH2826-5/90/0000/10625/$01.00© 1990 ieee pp. 1062 to 1070.

* cited by examiner

APPARATUS AND METHOD FOR PACKET-BASED MEDIA COMMUNICATIONS

FIELD OF THE INVENTION

This invention relates generally to packet-based media communications and more specifically to media conferencing within a packet-based communication network.

BACKGROUND OF THE INVENTION

Prior to the use of packet-based voice communications, telephone conferences were a service option available within standard non-packet-based telephone networks such as Pulse Code Modulation (PCM) telephone networks. As depicted in FIG. 1, a standard telephone switch 20 is coupled to a plurality of telephone handsets 22 to be included within a conference session as well as a central conference bridge 24. It is noted that these telephone handsets 22 are coupled to the telephone switch 20 via numerous other telephone switches (not shown). The telephone switch 20 forwards any voice communications received from the handsets 22 to the central conference bridge 24, which then utilizes a standard algorithm to control the conference session.

One such algorithm used to control a conference session, referred to as a "party line" approach, comprises the steps of mixing the voice communications received from each telephone handset 22 within the conference session and further distributing the result to each of the telephone handsets 22 for broadcasting. A problem with this algorithm is the amount of noise that is combined during the mixing step, this noise comprising a background noise source corresponding to each of the telephone handsets 22 within the conference session.

An improved algorithm for controlling a conference session is disclosed within U.S. patent application Ser. No. 08/987,216 entitled "Method of Providing Conferencing in Telephony" by Dal Farra et al, filed on Dec. 9, 1997, assigned to the assignee of the present invention, and herein incorporated by reference. This algorithm comprises the steps of selecting primary and secondary talkers, mixing the voice communications from these two talkers and forwarding the result of the mixing to all the participants within the conference session except for the primary and secondary talkers; the primary and secondary talkers receiving the voice communications corresponding to the secondary and primary talkers respectively. The selection and mixing of only two talkers at any one time can reduce the background noise level within the conference session when compared to the "party line" approach described above.

In a standard PCM telephone network as is depicted in FIG. 1, all of the voice communications are in PCM format when being received at the central conference bridge 24 and when being sent to the individual telephone handsets 22. Hence, in this situation, the mixing of the voice communications corresponding to the primary and secondary talkers is relatively simple with no conversions of format required.

Currently, packet-based voice communications are being utilized more frequently as Voice-over-Internet Protocol (VoIP) becomes increasingly popular. In these standard VoIP voice communications, voice data in PCM form is being encapsulated with a header and footer to form voice data packets; the header in these packets having, among other things, a Real Time Protocol (RTP) header that contains a time stamp corresponding to when the packet was generated.

One area that requires considerable improvement is the use of packet-based voice communications to perform telephone conferencing capabilities.

As depicted within FIG. 2, a plurality of packet-based voice communication terminals, VoIP handsets 26 in this case, are coupled to a packet-based network, an IP network 28 in this case. Currently, in order for the users of these VoIP handsets 26 to communicate within a voice conference, a packet-based voice communication central bridge, in this case a VoIP central conference bridge 30, must be coupled to the IP network 28. This VoIP central conference bridge 30 has a number of problems, the key problems being the latency inherently created within the conference bridge 30 and the considerable amount of signal processing power required. It should be noted that the high signalling power required is partially due to the conference bridge having to compensate for a variety of problems that typically exist within current IP networks; these problems including possible variable delays, out-of-sequence packets, lost packets, and/or unbounded latency.

FIG. 3A is a logical block diagram of a well-known VoIP central conference bridge design while FIG. 3B is a logical block diagram of a well-known VoIP handset design. In the design of FIG. 3A, the conference bridge 30 comprises an inputting block 32, a talker selection and mixing block 34, and an outputting block 36. Typically all three of these blocks are implemented in software.

The inputting block 32 comprises, for each participant within the voice conference, a protocol stack (P.S.) 38 coupled in series with a jitter buffer (J.B.) 40 and a decompression block (DECOMP.) 42, each of the decompression blocks 42 further being coupled to the talker selection and mixing block 34. The protocol stacks 38 in this design perform numerous functions including receiving packets comprising compressed voice signals, hereinafter referred to as voice data packets; stripping off the packet overhead required for transmitting the voice data packet through the IP network 28; and outputting the compressed voice signals contained within the packets to the respective jitter buffer 40. The jitter buffers 40 receive these compressed voice signals; ensure that the compressed voice signals are within the proper sequence (i.e. time ordering signals); buffer the compressed voice signals to ensure smooth playback; and ideally implement packet loss concealment. The output of each of the jitter buffers 40 is a series of compressed voice signals within the proper order that are then fed into the respective decompression block 42. The decompression blocks 42 receive these compressed voice signals, convert them into standard PCM format and output the resulting voice signals (that are in Pulse Code Modulation) to the talker selection and mixing block 34.

The talker selection and mixing block 34 preferably performs almost identical functionality to the central conference bridge 24 within FIG. 1. The key to the design of a VoIP central conference bridge 30 as depicted in FIG. 3A is the inputting block 32 transforming the packet-based voice communications into PCM voice communications so the well-known conferencing algorithms can be utilized within the block 34. As described previously, in one conferencing algorithm, primary and secondary talkers are selected for transmission to the participants in the conference session to reduce the background noise level from participants who are not talking and to simplify the mixing algorithm required. Hence, the resulting output from the talker selection and mixing block 34 is a voice communication consisting of a mix between the voice communications received from a primary talker and a secondary talker; the primary and secondary talkers being determined within the block 34. Further outputs from the talker selection and mixing block 34 include the unmixed voice communications of the primary and secondary talkers that are to be forwarded, as described previously, to the secondary and primary talkers respectively.

The outputting block 36 comprises three compression blocks 44 and a plurality of transmitters 46. The compression blocks 44 receive respective ones of the three outputs from the talker selection and mixing block 34, compress the received voice signals, and independently output the results to the appropriate transmitters 46. In this case, the mixed voice signals, after being compressed, are forwarded to all the transmitters 46 with the exception of the transmitters directed to the primary and secondary talkers. The transmitters directed to the primary and secondary talkers receive the appropriate unmixed voice signals. Each of the transmitters 46, after receiving a compressed voice signal, subsequently encapsulates this compressed voice signal within the packet-based format required for transmission on the IP network 28 and transmits a voice data packet comprising the compressed voice signal to the appropriate VoIP handset 26 within the conference session.

The well-known handsets 26, as depicted in FIG. 3B, each comprise a protocol stack 47 coupled in series with a jitter buffer 48 and a decompression block 49, these blocks typically being implemented in software. Voice data packets sent from the central conference bridge 30 are received at the protocol stack 47 which subsequently removes the packet overhead from the received voice data packets, leaving only the compressed voice signal sent from the packet-based central conference bridge 30. The jitter buffer 48 next performs numerous functions similar to those performed by the jitter buffers 40 including ensuring that the compressed voice signals are within the proper sequence, buffering the compressed voice signals to ensure smooth playback, and ideally implementing packet loss concealment. Subsequently, the decompression block 49 receives the compressed voice signals, decompresses them into PCM format, and forwards the voice signals to the speaker within the particular handset 26 for broadcasting the voice signals audibly.

One key problem with the setup depicted within FIGS. 3A and 3B is the degradation of the voice signals as the voice signals are converted from PCM format to compressed format and vice versa, these conversions together being referred to generally as transcoding. A further problem results from the considerable latency that the processing within the VoIP central conference bridge 30 and the processing within the individual handsets 26 create. The combined latency of this processing can result in a significant delay between when the talker(s) speaks and when the other participants in the conference session hear the speech. This delay can be noticeable to the participants if it is beyond the perceived real-time limits of human hearing. This could result in participants talking while not realizing that another participant is speaking. Yet another key problem with the design depicted in FIGS. 3A and 3B is the considerable amount of signal processing power that is required to implement the conference bridge 30. As stated previously, each of the components shown within FIG. 3A are normally simply software algorithms being run on DSP components(s). This considerable amount of required signal processing power is expensive.

Hence, a new design within a packet-based voice communication network is required to implement voice conferencing functionality. In this new design, a reduction in transcoding, latency, and/or required signal processing power within the central conference bridge is needed.

SUMMARY OF THE INVENTION

The present invention is directed to packet-based central conference bridges and other packet-based components, such as packet-based network interfaces and packet-based terminals, that could be used for media communications over a packet-based network, these media communications preferably being voice communications. The apparatus of the present invention can preferably allow for voice conferences as well as point-to-point communications to be established within the packet-based network with a reduction in transcoding, latency and/or signal processing requirement.

Some embodiments of the present invention decrease the latency within a voice conference by selecting the talkers prior to the decompression of the voice signals, hence making the decompression and subsequent compression operations in a conference bridge unnecessary in some circumstances. Further, the removal of the jitter buffers within the conference bridges and the moving of the mixing operation to the individual packet-based components are both included within embodiments of the present invention. These modifications preferably make for increased performance within the system by decreasing transcoding and latency within a conference session and result in decreased costs by reducing the required signal processing power for the system. Yet further, the modifications within the conference bridge allow for increased functionality such as an interlocking configuration of conference bridges and three way calling without the use of a conference bridge at all.

The present invention, according to a first broad aspect, is a conference bridge, including a receiver and a energy detection and talker selection unit. The receiver is capable of being coupled to a network and operates to receive at least one media data packet from at least two sources forming a media conference, each media data packet defining a compressed media signal. The energy detection and talker selection unit is coupled to the receiver and operates to determine at least one speech parameter corresponding to each of the compressed media signals and select a set of the sources within the media conference as talkers based on the determined speech parameters.

According to a second broad aspect, the present invention is a conference bridge that includes a receiver, an energy detection and talker selection unit and an output unit. The receiver is capable of being coupled to a network and operates to receive at least one media data packet from at least two sources forming a media conference, each media data packet defining a compressed media signal. The energy detection and talker selection unit is coupled to said receiver and operates to process the received compressed media signals including selecting a set of the sources within the media conference as talkers, one of the talkers being a lead talker. And, the output unit is coupled to the energy detection and talker selection unit and operates to output media data packets that correspond to compressed media signals received from the talkers. In this aspect, the media data packets corresponding to the lead talker are always output from the conference bridge in the same order as the media data packets which are received from the lead talker.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which.

DETAILED DESCRIPTION OF THE PREFERRED EMBODIMENT

The present invention is directed to a number of different methods and apparatuses that can be utilized within a packet-based voice communication system. Primarily, the embodiments of the present invention are directed to methods and apparatus used for voice conferences within packet-based communication networks, but this is not meant to limit the scope of the present invention.

One skilled in the art would understand that there are two essential sectors for the operations of a telephone session. These sectors include a control plane that performs administrative functions such as access approval and build-up/tear-down of telephone sessions and/or conference sessions and a media plane which performs the signal processing required on media (voice or video) streams such as format conversions and mixing operations. As described below, the present invention is applicable to modifications within the media plane which could be implemented with a variety of different control planes while remaining within the scope of the present invention.

Figure 1:
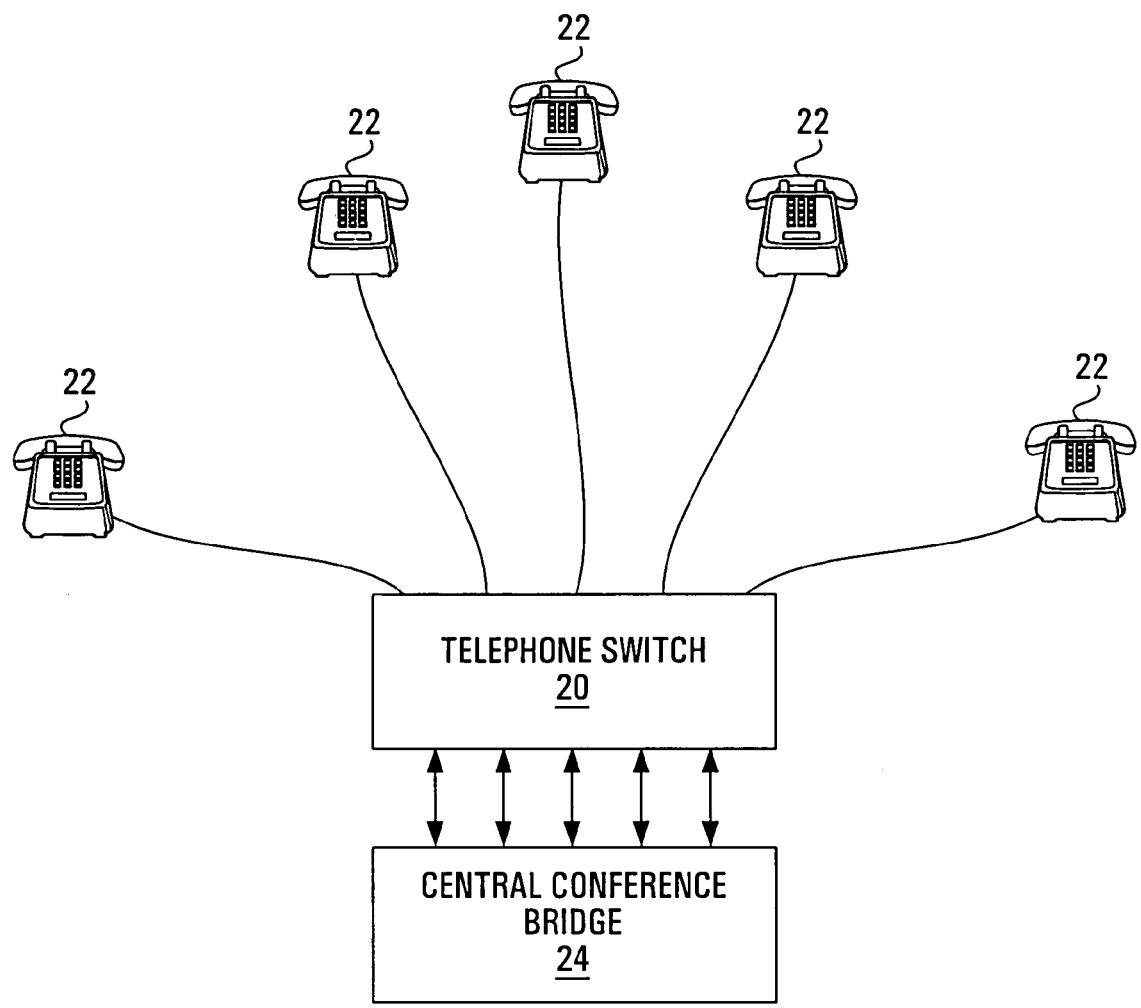
FIG. 1 is a simplified block diagram illustrating a well-known non-packet-based telephone network with a voice conferencing capability.
Figure 2:
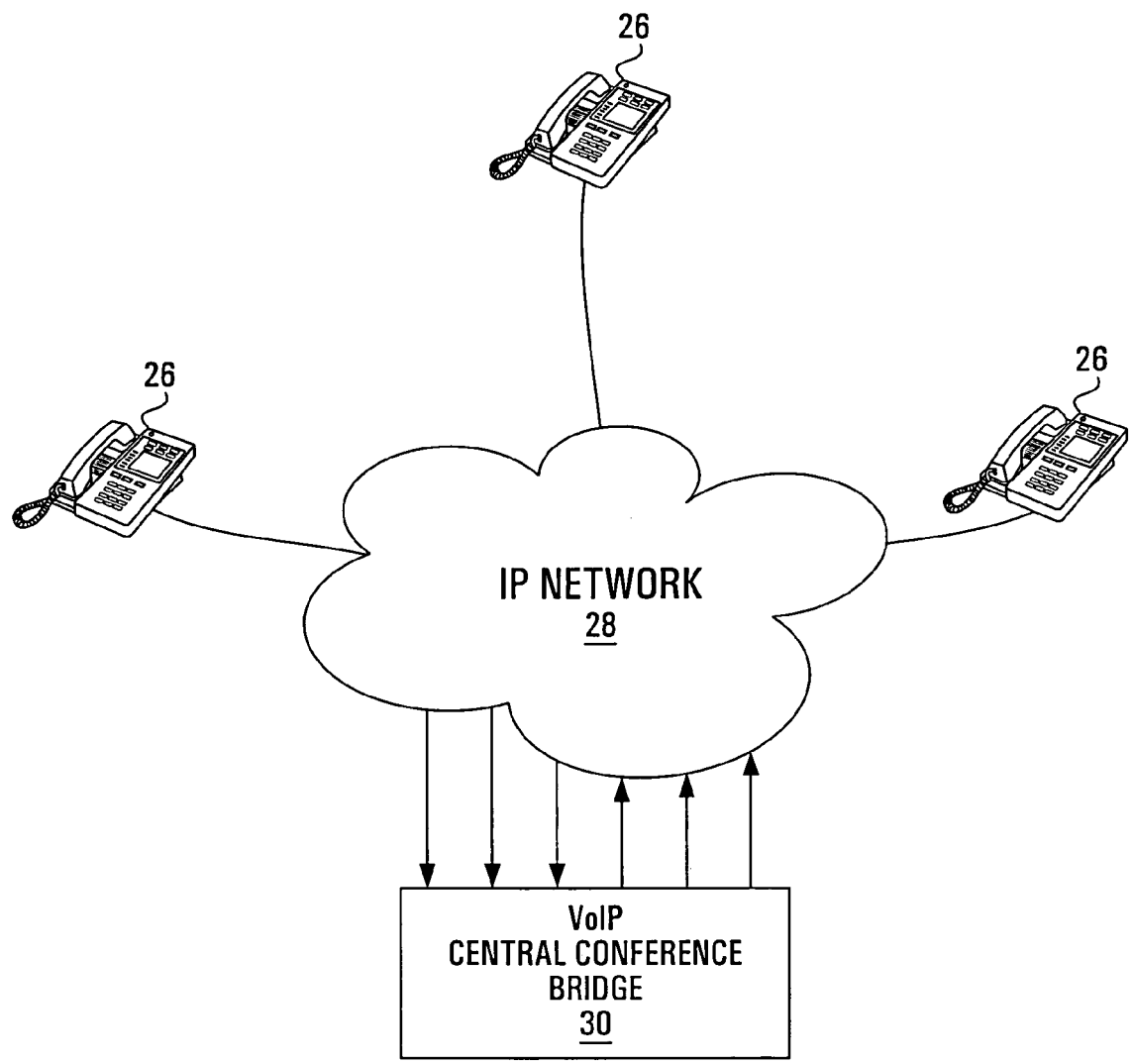
FIG. 2 is a simplified block diagram illustrating a well-known packet-based network with a voice conferencing capability.
Figure 13:
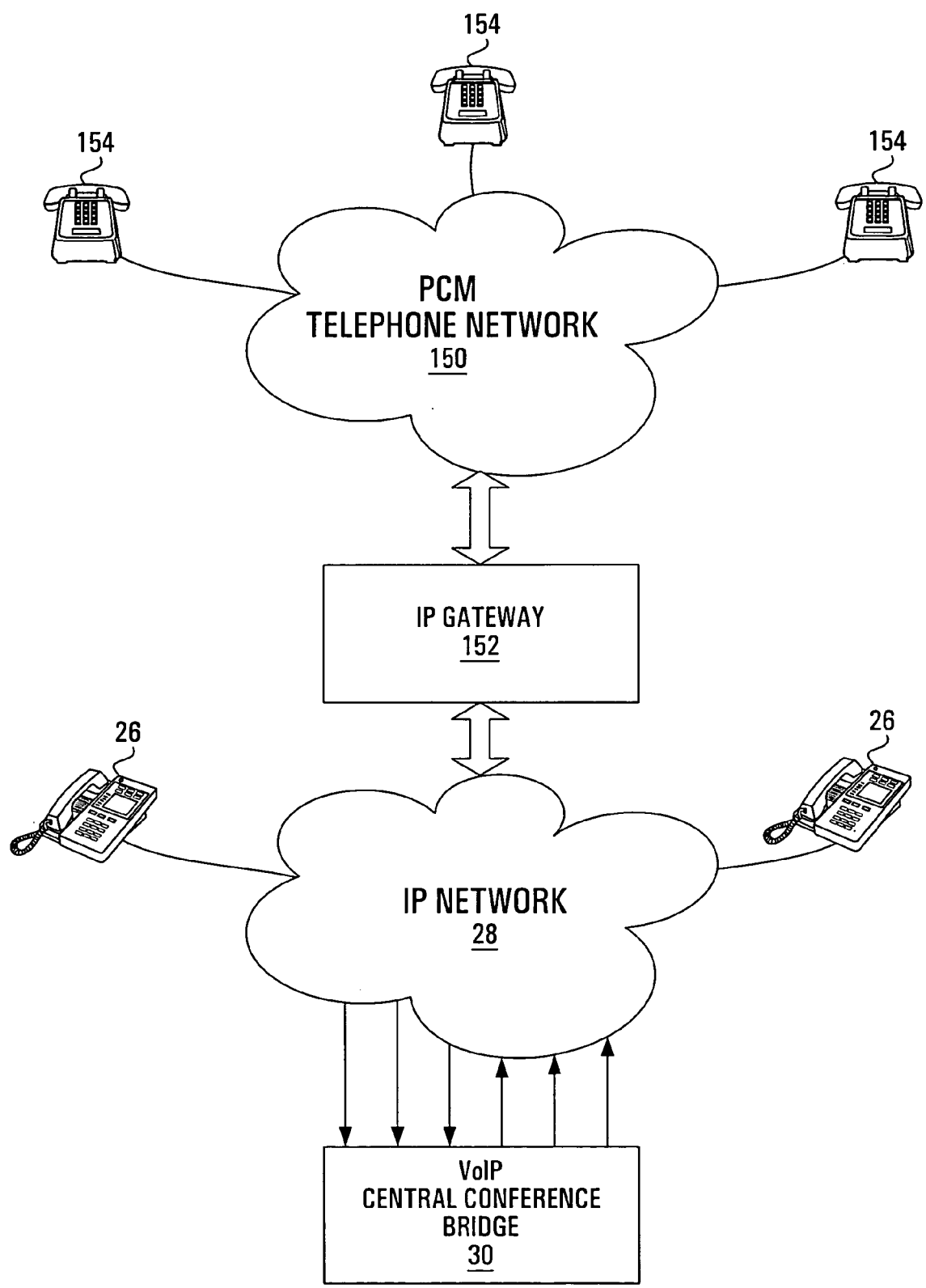
FIG. 13 is a simplified block diagram illustrating a well-known packet-based network coupled to a well-known PCM telephone network with a voice conferencing capability.

One significant aspect of the present invention described herein below is directed to a packet-based central conference bridge coupled to a packet-based network for enabling voice conferences between numerous sources of media signals. These sources of media signals can be any terminal that a person can output media data for transmission to the conference bridge and can input media data from the conference bridge. In preferred embodiments, these sources of media signals are packet-based terminals coupled to a packet-based network, such is illustrated for the VoIP handsets 26 coupled to the IP network 20 within FIG. 2. In other embodiments, one or more of the sources of media signals are other terminals such as standard non-packet-based telephone terminals, such as PCM or analog telephone terminals, that are coupled to a packet-based network via a packet-based network interface. This situation is illustrated for in FIG. 13 in which a non-packet-based telephone network, in this case PCM telephone network 150, is coupled to a packet-based network, in this case IP network 28, via a packet-based network interface, in this case IP Gateway 152. As shown in FIG. 13, a number of standard PCM telephone handsets 154 are coupled to the PCM telephone network 150, these PCM telephone handsets 154 possibly being considered as sources of media signals within the preferred embodiments of the present invention. Further, sources of media signals could be other devices that allow for the inputting and outputting of media data, this media data being in the form of media data packets when it is received at/sent from the packet-based central conference bridge described for preferred embodiments of the present invention.

In the following description, it should be understood that despite referring to the sources of media signals as packet-based terminals throughout this document, such references could alternatively be directed to another form of media signal source. Further, the following description of the preferred embodiments of the present invention is specific to voice data packets that contain compressed voice signals, though this should not limit the scope of the present invention as is described in further detail herein below.

Figure 3A:
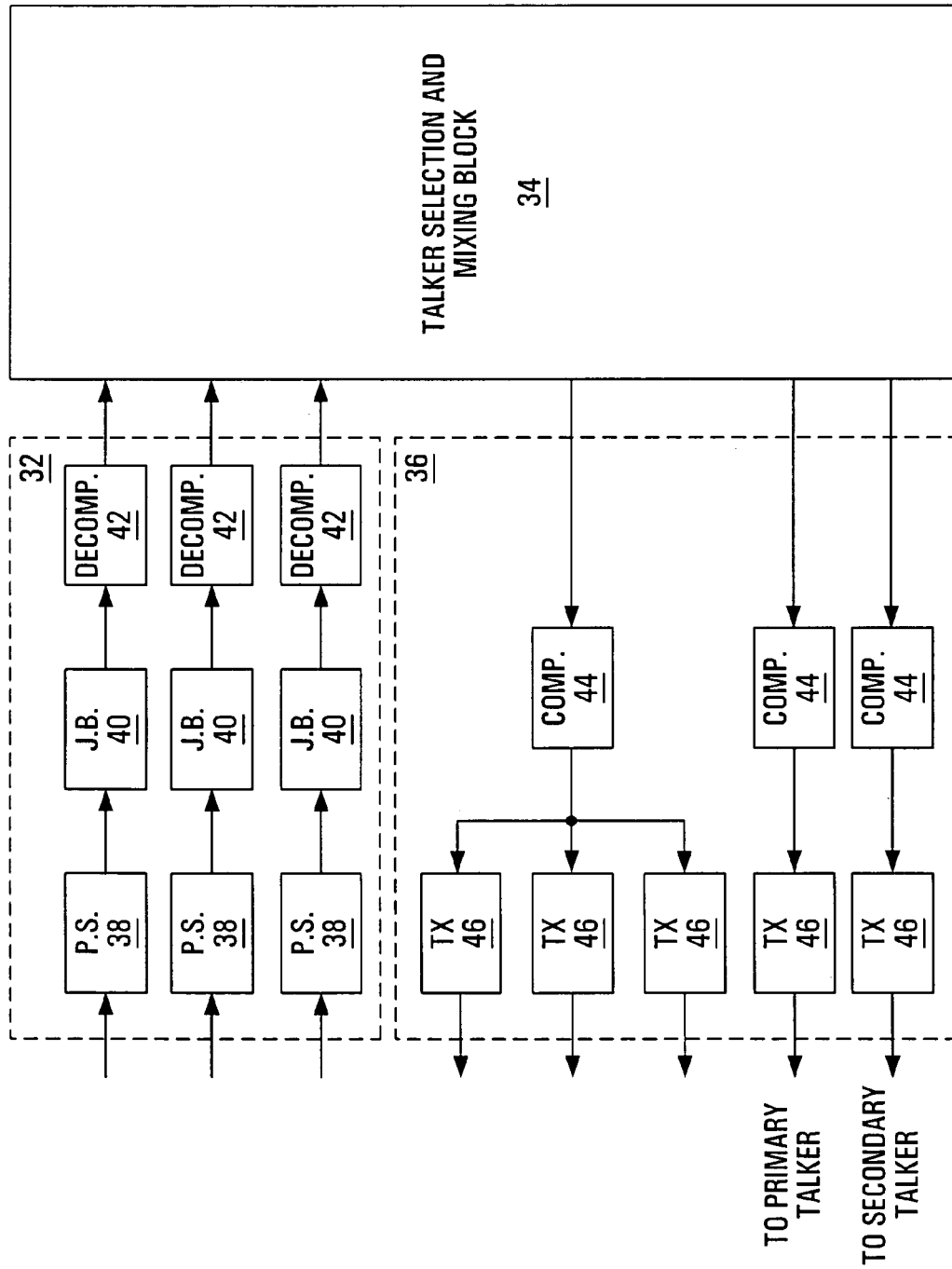
FIGS. 3A and 3B are logical block diagrams illustrating a well-known packet-based central conference bridge and a well-known packet-based handset respectively implemented within the packet-based network of FIG. 2.
Figure 4:
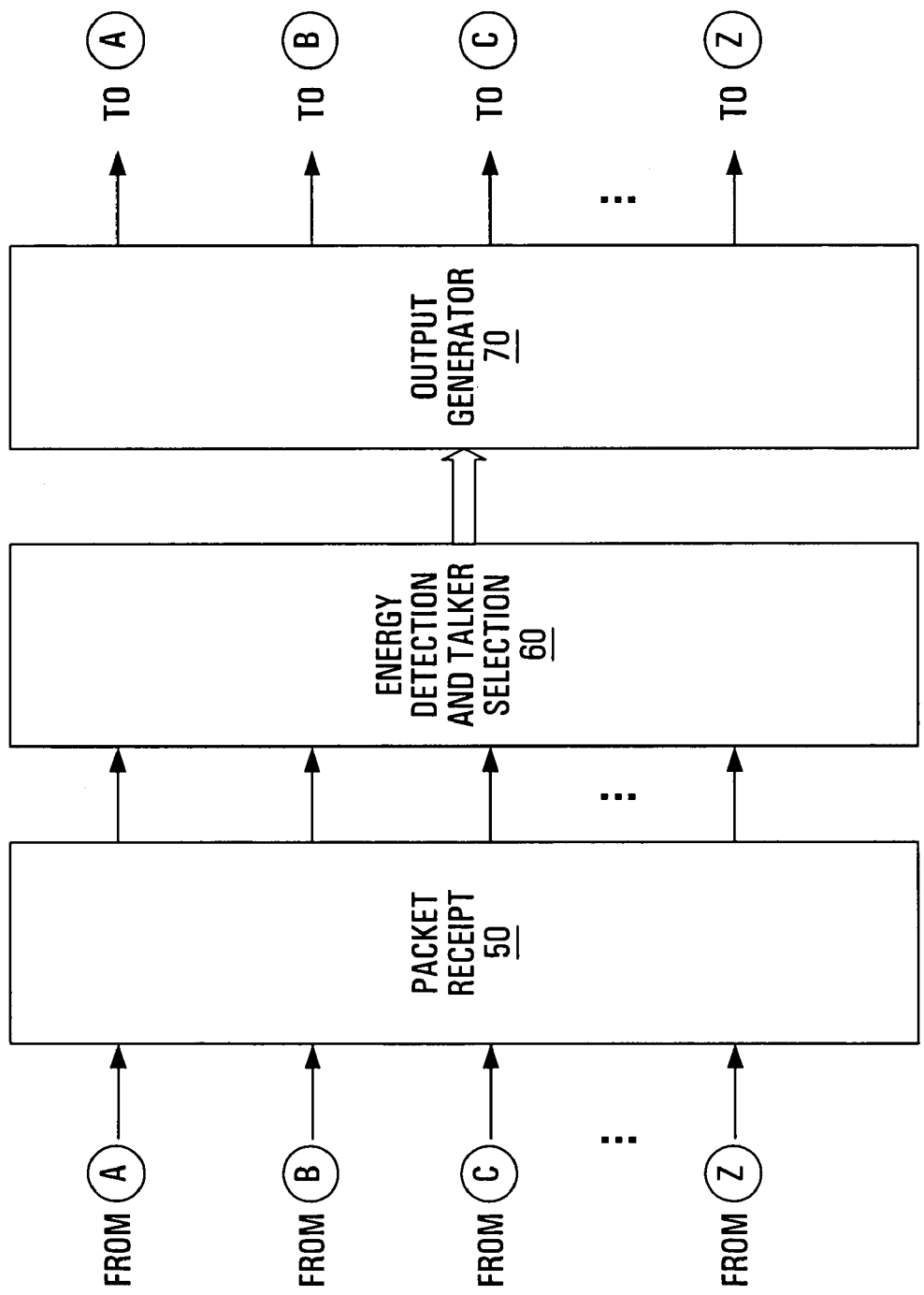
FIG. 4 is a simplified block diagram illustrating a packet-based central conference bridge according to first and second preferred embodiments of the present invention.

FIG. 4 illustrates a simplified block diagram, according to first and second preferred embodiments of the present invention, that illustrates a packet-based central conference bridge that could be coupled to a packet-based network for enabling voice conferences between numerous sources of media signals, as will be described below as packet-based terminals. This conference bridge preferably replaces within FIG. 2, the conference bridge depicted within FIG. 3A. There are a number of differences between the conference bridge depicted in FIG. 4 and that of FIG. 3A as will be described herein below. These differences, in some circumstances, decrease the transcoding and latency inherently within the traditional packet-based central conference bridge and reduce the required signal processing power.

As depicted in FIG. 4, the conference bridge of the first and second preferred embodiments comprises a packet receipt block 50, an energy detection and talker selection block 60, and an output generator 70. Although the blocks within FIG. 4 are depicted as separate components, these blocks are meant to be logical representations of algorithms which are hereinafter referred to collectively as conferencing control logic. Preferably, some or all of the conferencing control logic is essentially software algorithms operating within a single control component such as a DSP. In alternative embodiments, some or all of the conferencing control logic is comprised of hard logic and/or discrete components.

Figure 10:
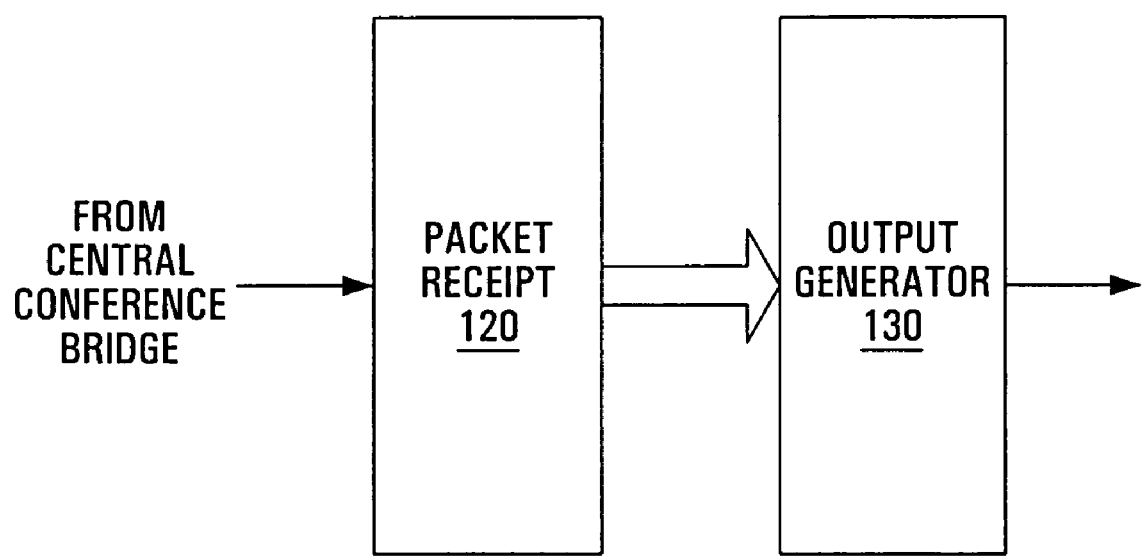
FIG. 10 is a simplified block diagram illustrating a packet-based handset according to the second preferred embodiment of the present invention.
Figure 11:
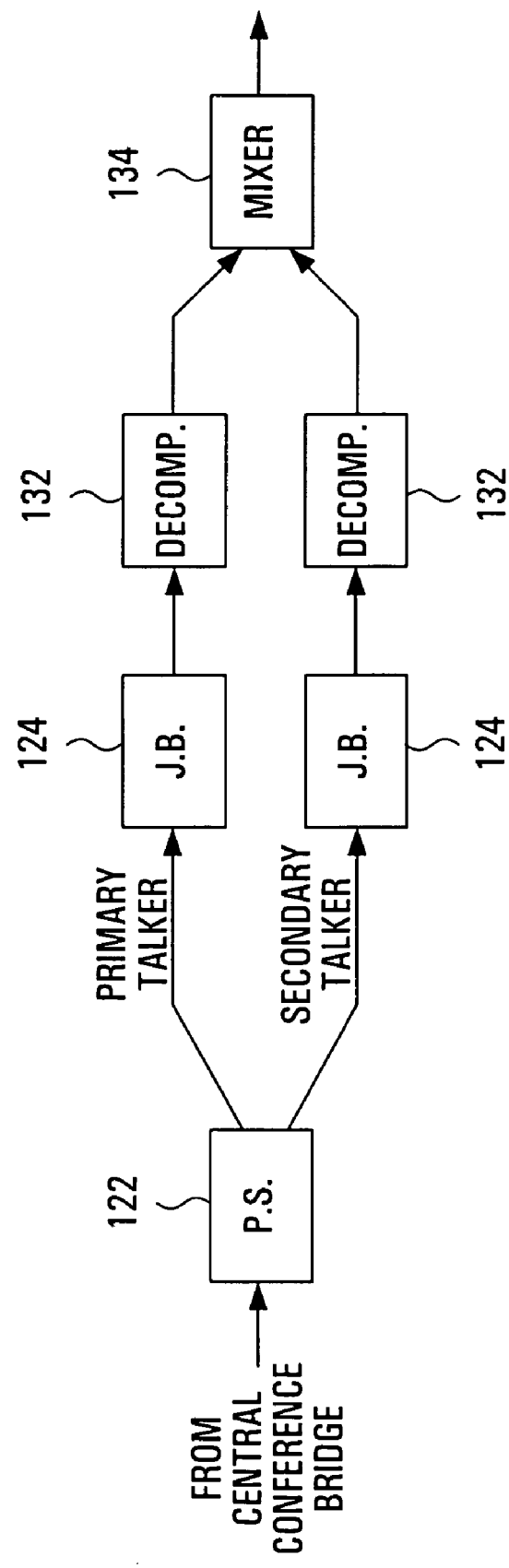
FIG. 11 is a logical block diagram illustrating the packet-based handset of FIG. 10 during a sample operation.

The operations of the packet receipt block 50 and the energy detection and talker selection block 60, according to both the first and second preferred embodiments, will be described with reference to FIG. 5. The key difference between the first and second embodiments of the present invention, as will be described herein below, is the operations performed within the output generator 70. The operation of the output generator 70, according to the first preferred embodiment, will be described with reference to FIG. 6 while the operation of the output generator 70, according to the second preferred embodiment, will be described with reference to FIG. 8. It is noted that when using the packet-based central conference bridge of the first preferred embodiment, the participants within a voice conference preferably can utilize well-known packet-based terminals such as the handset depicted in FIG. 3B. On the other hand, when using the conference bridge according to the second preferred embodiment, the packet-based terminals utilized by the participants of a voice conference preferably must be modified, as will be described herein below with reference to FIGS. 10 and 11, compared to well-known packet-based handsets. In the case that the user is using a non-packet-based terminal via a packet-based network interface, it is noted that a similar situation arises. In the first preferred embodiment, a well-known packet-based network interface can be utilized which is similar to that depicted in FIG. 3B but with the decompressed signals being sent on the non-packet-based telephone network (such as a PCM telephone network) to the appropriate non-packet-based terminals (such as PCM terminals) rather than to a speaker. In the case of the second preferred embodiment, the packet-based network interface used will have to be modified as will be described below with reference to FIGS. 10 and 11.

Figure 5:
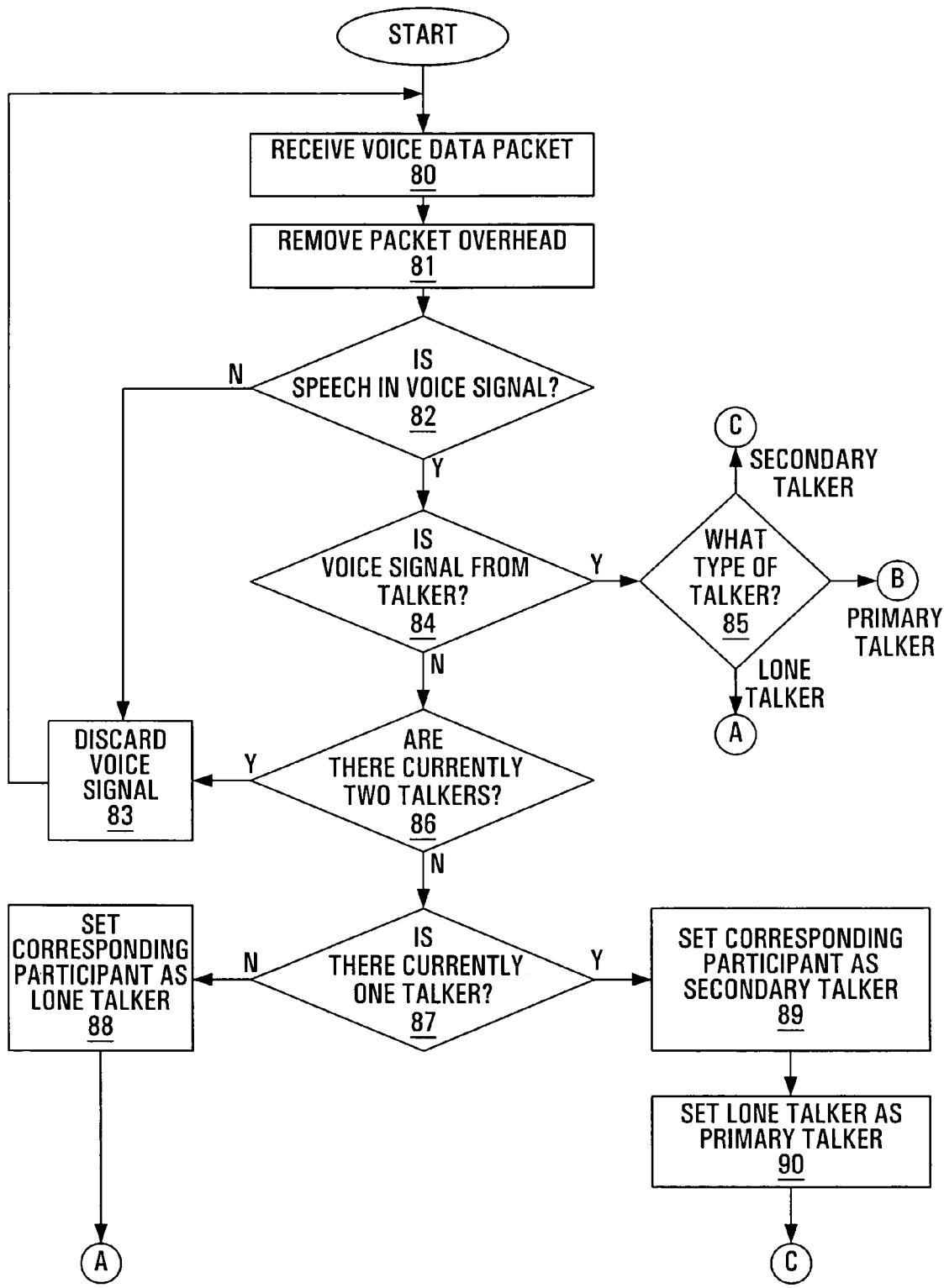
FIG. 5 is a flow chart illustrating the operations preferably performed by a packet receipt block and an energy detection and talker selection block implemented within the packet-based central conference bridge of FIG. 4.

FIG. 5 is a flow chart that depicts the steps performed by the packet receipt block 50 and the energy detection and talker selection block 60 according to both the first and second preferred embodiments of the present invention. This flow chart depicts the processing that occurs for a single voice data packet received by the packet-based central conference bridge. It should be understood that multiple packets could proceed through this procedure at any one time which could possibly result in more than one packet being processed at the same step at the same time. Since these steps are preferably software operations, the situation in which a multiple number of packets operate at a common step within the procedure simply indicates that the software is being used by different packets in parallel.

The first step 80, as depicted in FIG. 5, has the packet receipt block 50 receive a voice data packet from the packet-based network coupled to the conference bridge. This packet may be an IP packet or a packet of another format that can be transported on the packet-based network. The packet is sent from a packet-based terminal being used within a voice conference (more generally referred to as a source for media signals) and contains a compressed voice signal that corresponds to a participant that is speaking at the particular terminal.

Next, as seen at step 81, the packet receipt block 50 removes the packet overhead from the received voice data packet. This overhead may include the actual packet header and footer utilized, as well as any other transport protocol wrapper. The removal of the packet overhead results in only the compressed voice signal within the received packet being forwarded on for further processing. It is noted though that information contained within the packet overhead, such as the source address, is still preferably used by the control plane to identify the source terminal and the voice conference that this particular voice signal corresponds. Further, it is noted that a time stamp within an RTP header of the packet header is preferably extracted and used in later processing within the media plane as described below.

The compressed voice signal is subsequently processed by the energy detection and talker selection block 60 as depicted at steps 82 through 90. Firstly within this processing, the block 60 determines if the compressed voice signal contains speech at step 82 by performing an energy detection operation. A compressed voice signal containing speech indicates that the source of the corresponding voice data packet has a speaking participant local.

This energy detection operation can be performed in a number of different manners. In one preferred embodiment, a Voice Activity Detection (VAD) operation is enabled at the packet-based terminal that sent the voice data packet; the VAD operation alternatively being enabled at the packet-based network interface if the source of media signals is a non-packet-based telephone terminal. In this preferred embodiment, packets (and therefore compressed voice signals) that can contain speech can be distinguished from packets that do not by the number of bytes contained within the packet. In other words, the size of the compressed voice signal can determine whether it contains speech. For example, in the case that the G.723.1 VoIP standard is utilized, voice data packets containing voice would contain a compressed voice signal of 24 bytes while voice data packets containing essentially silence would contain a compressed voice signal of 4 bytes.

In another preferred embodiment, in which a VAD operation is not enabled at the packet-based terminal (or packet-based network interface) sending the voice data packet, the block 60 determines if there is speech within the compressed voice signal by monitoring a pitch-related sector within the corresponding voice data packet. For example, within the G.723.1 VoIP standard, the pitch sector is an 18-bit field that contains pitch lag information for all subframes. In this particular embodiment, the block 60 uses the pitch sector to generate a pitch value for each subframe. If the pitch value is within a particular predetermined range, the corresponding compressed voice signal is said to contain speech. If not, the compressed voice signal is said to not contain speech. This predetermined range can be determined by experimentation or alternatively calculated mathematically. It is noted that many current VoIP standard codecs include pitch information as part of the transmitted packet and a similar comparison of pitch values with a predetermined range can be used with these standards. It is further noted that the energy determination operations which determine whether a particular compressed voice signal contains speech should not be limited to the above described embodiments.

If the compressed voice signal at step 82 is deemed to not contain speech, the particular signal is discarded at step 83. The frequency in which signals are discarded from a signal source based upon there lack of speech affects the de-selection of talkers for the voice conference as will be described herein below. If the compressed voice signal at step 82 does contain speech, the energy detection and talker selection block 60 proceeds to determine at step 84 whether the compressed voice signal is from a packet-based terminal (more generally a source of media data packets) selected to be a talker; voice signals from talkers being the only voice signals heard by the participants within the voice conference.

The selection and de-selection of terminals as talkers is performed by a talker selection algorithm within the block 60. Although it is the terminal that is referenced as the source for the voice data packets containing speech, for simplicity herein below, the description will refer to the talker selection algorithm determining which participants are speaking rather than referring to which terminals have participants that are speaking. It should be recognized that a reference to a participant speaking indicates that the voice data packet received from the terminal corresponding to the particular participant has been deemed to contain speech.

There are three main situations, according to preferred embodiments, which would result in different operations for the talker selection algorithm, these situations being no participants speaking, only one participant speaking, and two or more participants speaking at once. For the first case in which there is no participants speaking, the talker selection algorithm preferably has no terminals selected as talkers, thus preventing the sending of any voice data packets from the packet-based central conference bridge and further removing the need for any further processing to take place. Alternatively, the talker selection algorithm could transmit empty voice data packets to the terminals within the voice conference when there are no talkers selected in order to maintain continuous packet transmission.

When considering the second case in which only one participant is speaking, the talker selection algorithm preferably has only one terminal selected as a talker, that terminal being the one corresponding to the speaking participant. In this situation, the single talker is hereinafter referred to as a "lone talker".

In the third case in which two or more participants at different terminals are speaking at the same time, the talker selection algorithm preferably has one terminal selected as a "primary talker" and a second terminal selected as a "secondary talker" for the voice conference. When considering this situation, the talker selection algorithm, according to preferred embodiments, selects the primary and secondary talkers using a predetermined selection parameter. In one preferred embodiment, this selection parameter is the order in which the participants began to speak. In another embodiment, the selection parameter takes into consideration the volume level of the participants (i.e. comparing the energy levels of the talkers). In yet another embodiment, a control mechanism is in place that automatically selects a participant to be the primary or secondary talker. This control mechanism could be utilized in cases that there is a moderator and/or a scheduled speaker for the voice conference.

The above described selection parameters are not meant to limit the scope of the present invention. In fact, the key to this portion of the preferable packet-based central conference bridge is the selection of talkers while the parameter used for this selection and the number of talkers selected is not directly relevant to the present invention.

Preferably, the talker selection algorithm comprises a software algorithm that is continuously operating during a voice conference with the determination of those speaking and the selection of no talkers, a lone talker, or primary and secondary talkers being dynamic during the receiving of voice data packets as will be described with reference to steps 84 through 90. As well, the talker selection algorithm preferably performs operations to de-select talkers continuously during the voice conference. These de-selection operations preferably including the steps of determining the length of time between voice data packets containing speech coming from the talker(s) and de-selecting any talker if the length of time between voice data packets containing speech exceeds a threshold level. Of course, other de-selection techniques could be utilized as the actual de-selection operation being used is not critical to the present invention.

Referring back to FIG. 5, the above described talker selection algorithm, for the case that the talker selection parameter is the order in which the participants begin to speak and a maximum of two talkers are selected at once, is implemented in steps 84 through 90. As mentioned previously at step 84, the energy detection and talker selection block 60 determines if the compressed voice signal is from a participant selected as a talker. If the compressed signal is from a talker, the talker selection algorithm determines, as depicted at step 85, if the talker is a lone talker, a primary talker, or a secondary talker. As will be described herein below, the output generator 70 processes the compressed voice signal differently depending on the "type" of talker it corresponds to.

If, at step 84, the compressed voice signal does not correspond to a talker selected by the talker selection algorithm, the talker selection algorithm proceeds to determine if there are currently two talkers selected at step 86. If there are two talkers already selected, the compressed voice signal is discarded at step 83. If there are not two talkers already selected at step 86, the talker selection algorithm determines if there is currently a lone talker selected at step 87. If there is not a lone talker already selected at step 87, the talker selection algorithm selects the participant corresponding to the particular compressed voice signal as the lone talker at step 88. If there is a lone talker currently selected at step 87, the talker selection algorithm proceeds to set the participant corresponding to the particular compressed voice signal as the secondary talker at step 89 and to set the lone talker as the primary talker at step 90. The output generator 70, as described below, then processes the compressed voice signal as if it was received from the particular talker it's corresponding participant is now set as.

Figure 6:
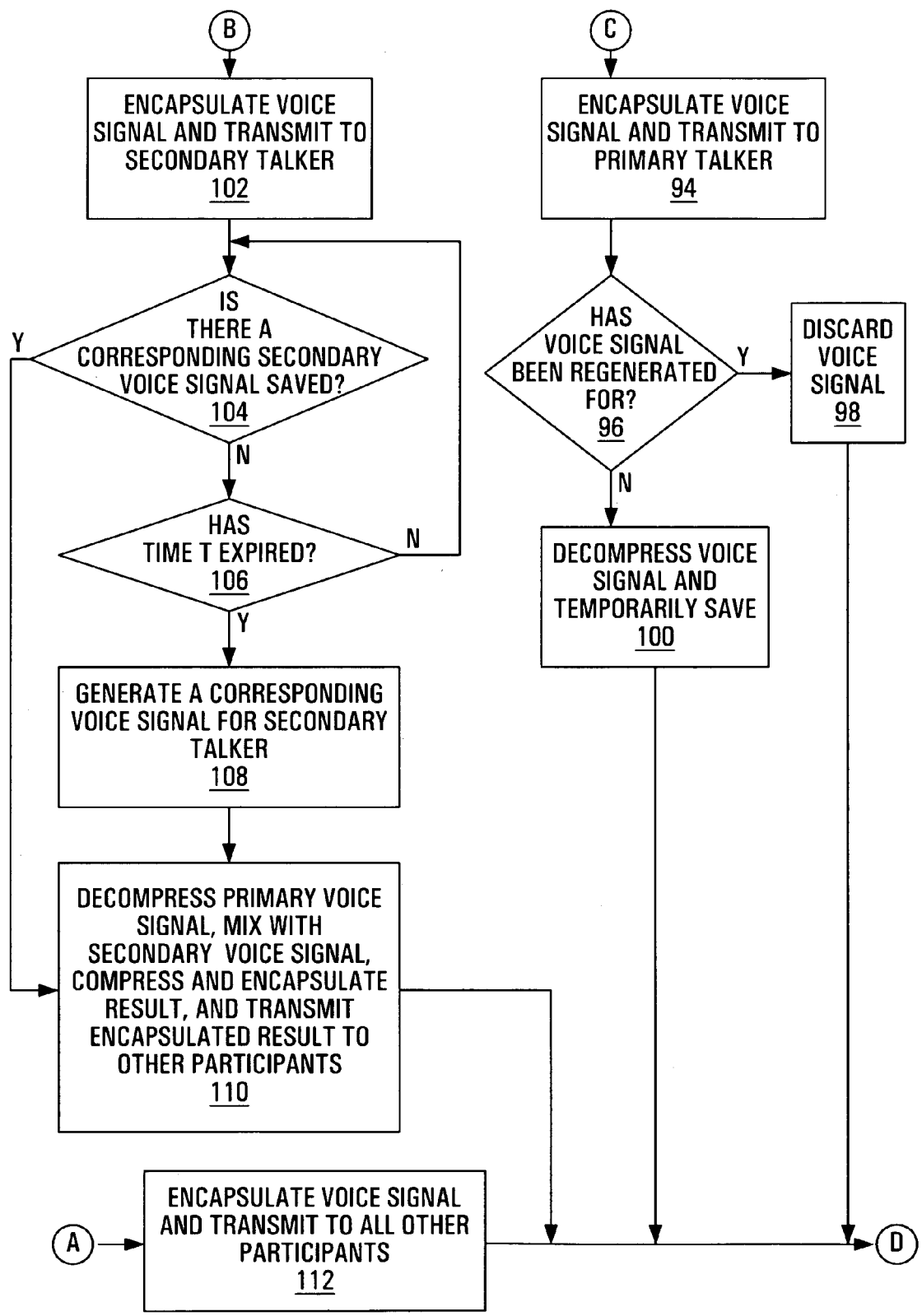
FIG. 6 is a flow chart illustrating the operations performed, according to the first preferred embodiment, by an output generator implemented within the packet-based central conference bridge of FIG. 4.

The procedure that occurs within the output generator 70, according to the first preferred embodiment, if the compressed voice signal corresponds to one of a lone talker, a primary talker, and a secondary talker will now be described with reference to FIG. 6. Firstly, at step 94, if the compressed voice signal corresponds to the secondary talker, the compressed voice signal, hereinafter referred to as a secondary voice signal, is initially encapsulated into a packet format suitable for transmission on a packet-based network and further transmitted to the primary talker via the packet-based network. Next, the output generator determines whether the secondary voice signal has previously been regenerated for at step 96 by monitoring the time stamp associated with the secondary voice signal and comparing it to the time stamps associated with previously received secondary voice signals. If it is found that the voice signal was previously regenerated for, the secondary voice signal is discarded at step 98 and the conferencing control logic returns to step 80. If it is found that the voice signal has not previously been regenerated for, the secondary voice signal, as depicted at step 100, is decompressed (converting it into a decompressed voice signal that is preferably a PCM signal) and preferably temporarily saved within the output generator 70 in both compressed and decompressed formats. Alternatively, the secondary voice signal is saved within only one of the compressed and decompressed formats. Saving in only the decompressed format would result in the need for a decompression operation at a subsequent step.

If it is determined that the compressed voice signal corresponds to the primary talker, the output generator 70, as shown at step 102, encapsulates the voice signal, hereinafter referred to as the primary voice signal, within a packet format satisfactory for transmission on a packet-based network and further transmits the resulting voice data packet to the secondary talker via the packet-based network. Subsequently, at step 104, it is determined whether there is a secondary voice signal currently saved within the output generator 70 with a corresponding time stamp.

If there is no corresponding secondary voice signal currently saved, it is determined at step 106 whether a predetermined time T has expired at step 106. This predetermined time T is a waiting period in which the output generator 70 will not transmit the primary voice signal as the procedure returns to step 104. This compensates for minor delays caused in the network by providing the voice data packets arriving from the secondary talker a limited amount of leeway after the arrival of a voice data packet corresponding to the primary talker. Preferably, if no voice data packets arrive from the secondary talker after the time T expires, the voice data packets corresponding to the primary talker are not subsequently delayed by this delay mechanism. If the predetermined time T has expired at step 106, a voice signal is generated for the secondary talker at step 108 with the use of a packet loss concealment algorithm. This generated voice signal is an approximation of what the secondary talker is saying based upon previous secondary voice data packets that were received. One such packet loss concealment algorithm is disclosed within U.S. patent application Ser. No. 09/353,906 entitled "Apparatus and Method of Regenerating a Lost Audio Segment" by Gunduzhan, filed on Jul. 15, 1999, assigned to the assignee of the present invention and herein incorporated by reference.

After the generation of a secondary voice signal at step 108 or if there was a corresponding secondary voice signal currently saved at step 104, a number of operations, as depicted at step 110, are preferably performed by the output generator 70 according to the first preferred embodiment. These operations include decompressing the compressed primary voice signal (and secondary voice signal if previously not done), hence converting it into an uncompressed voice signal that is preferably a PCM signal; mixing the primary voice signal with the secondary voice signal using a well-known mixing algorithm as is currently used for combining two uncompressed voice signals such as PCM signals, the primary and secondary voice signals being combined into a single uncompressed voice signal (preferably a PCM signal); compressing the resulting mixed voice signal; encapsulating the compressed mixed voice signal within a packet format capable of transmission on a packet-based network, this packet format preferably including a new Real Time Protocol (RTP) header with a time stamp; and transmitting the resulting voice data packet containing the compressed mixed voice signal to all the participants within the voice conference with the exception of the primary and secondary talkers. The transmitting of the resulting voice data packet preferably includes a unicast transmission to each participant that is to receive the particular voice data packet, a unicast transmission being a single transmission that travels from point A to point B. In an alternative embodiment, a single multicast transmission is sent in place of the plurality of unicast transmissions, the multicast transmission including the mixed voice signal, the unmixed primary and secondary voice signals, and an indication of which terminals should broadcast which voice signals. In this alternative, steps 94 and 102 would be removed.

If the compressed voice signal was determined to correspond to a lone talker, the output generator 70 preferably, as depicted at step 112, encapsulates the compressed voice signal in a packet format suitable for transmission on a packet-based network and subsequently transmits the voice data packet to all the participants within the voice conference with the exception of the lone talker. Similar to the description above, this voice data packet would preferably be transmitted using one or more unicast transmissions.

Figure 3B:
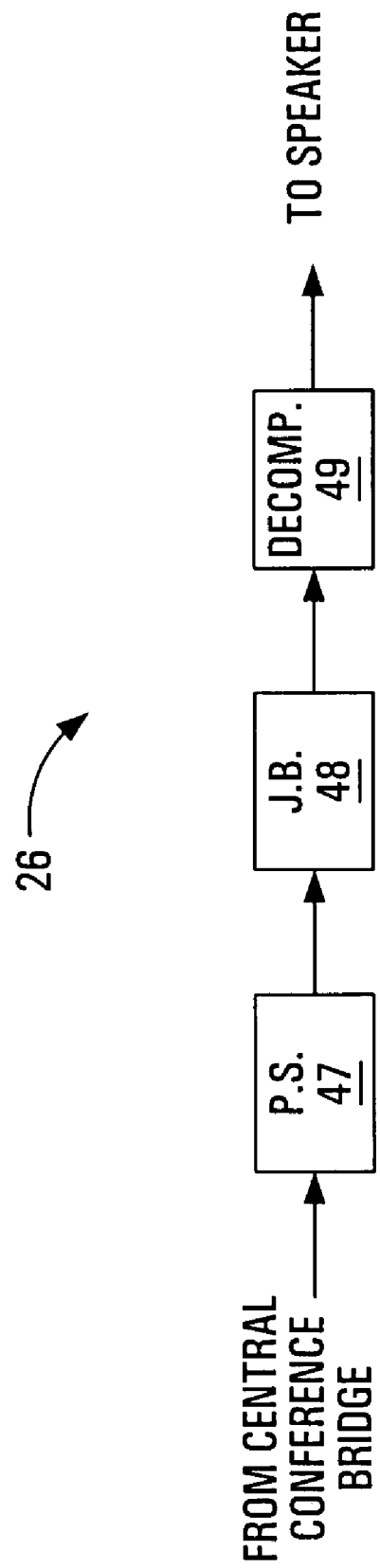

One of the keys to the packet-based central conference bridge according to the first preferred embodiment as described herein above is that the voice data packets received from the primary talker drive the transmission of the voice data packets mixed with the primary and secondary voice signals. This, along with the operation of the jitter buffers within the packet-based terminals as seen in FIG. 3B (or alternatively within the packet-based network interface), allow for the jitter buffers shown within FIG. 3A to be removed. The functionality of these jitter buffers 38 within FIG. 3A, such as buffering to ensure smooth playbacks, is performed with the jitter buffers within the packet-based terminals.

The problem with out-of-order voice data packets from the lone or primary talkers being received at the conference bridge can be dealt with in a number of ways without the use of a jitter buffer. It is noted that out-of-order voice data packets from the secondary talker are already compensated for within the procedure of FIG. 5. Firstly, in cases that out-of-order packets are not a significant problem, the conference bridge can discard any received voice data packets from the primary or lone talkers if they arrived later than a voice data packet from the same talker with an earlier time stamp. In an alternative embodiment to avoid out-of-order problems within packets received from primary or lone talkers, the time stamp from the original primary or lone voice signal is included as the time stamp for the voice data packet containing the mixed voice signal, these time stamps causing the jitter buffers within the terminals to compensate for the out-of-order packets of concern. Within further alternatives, a shallow jitter buffer could be implemented within the conference bridge to ensure the primary or lone voice signals are within the proper sequence.

Figure 7:
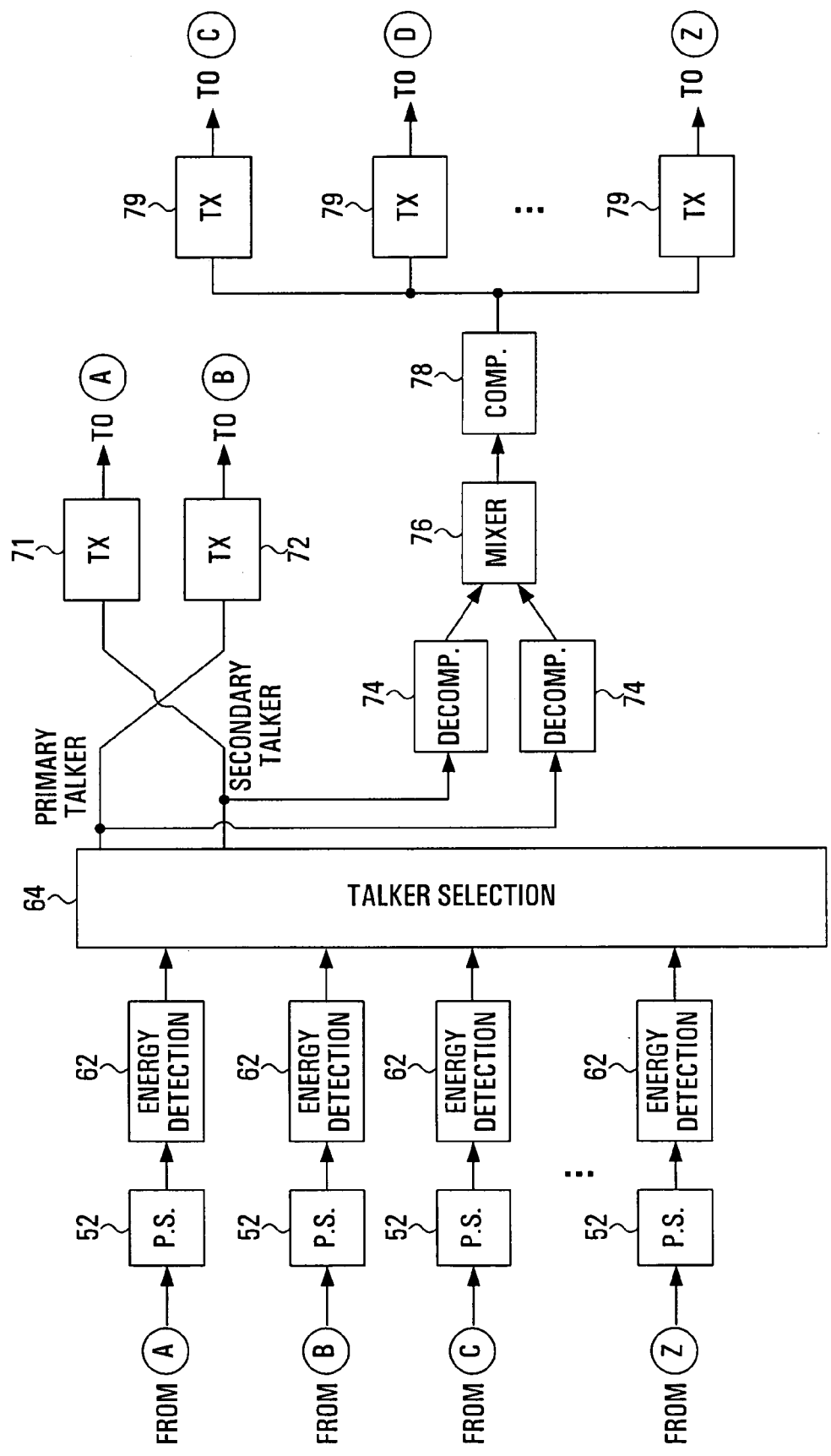
FIG. 7 is a logical block diagram illustrating the packet-based central conference bridge of FIG. 4 during a sample operation.

FIG. 7 is a logical block diagram illustrating the functionality of the packet-based central conference bridge according to the first preferred embodiment in the case that two or more participants are currently talking. As depicted in FIG. 7, the conference bridge in this situation logically comprises a plurality of protocol stacks 52, a plurality of energy detection blocks 62 each coupled in series with a respective one of the protocol stacks 52, a talker selection block 64 coupled independently to each of the energy detection blocks 62, participant A and B transmitters 71,72 independently coupled to the talker selection block 64, two decompression blocks 74 independently coupled to the talker selection block 64, a mixer 76 coupled to each of the decompression blocks 74, a compression block 78 coupled to the mixer 76, and a plurality of transmitters 79 coupled to the compression block 78.

As can be seen in FIG. 7, voice data packets from each of the participants, participants A through Z in this case, are input to a respective protocol stack 52. In this embodiment, these protocol stacks 52 are the only logical component within the packet receipt block 50, as no jitter buffers similar to those within the well-known conference bridge depicted in FIG. 3A are implemented. The protocol stacks 52 remove the packet overhead from the received voice data packets and output voice signals in compressed format. In preferred embodiments, the protocol stacks 52 together comprise a single software algorithm that is run for each received packet. In these preferred embodiments, the software algorithm is possibly run multiple times in parallel as numerous packets from different participants can be received at one time.

In the logical block diagram of FIG. 7 it can be seen that the compressed voice signal output from each of the protocol stacks 52 is subsequently received by a corresponding energy detection block 62. These energy detection blocks 62 are preferably one of the logical components within the energy detection and talker selection block 60, with the energy detection blocks 62 together comprising a single software algorithm that is run for each compressed voice signal. It is determined for each of the voice signals within the received voice data packets whether the voice signal contains speech with use of the energy detection blocks 62, these determinations being forwarded to the talker selection block 64.

The talker selection block 64 preferably receives the determinations of which of the received voice signals contain speech and, in the case of two or more speakers, determine who is the primary and secondary talkers. FIG. 7 depicts the case that there are at least two current talkers in the voice conference and the talker selection block 64 has selected participant A as the primary talker and participant B as the secondary talker.

This results, within the output generator 70, in compressed voice signals from participant A being sent to the participant B transmitter 72 and one of the decompression blocks 74 while the compressed voice signals from participant B are sent to the participant A transmitter 71 and the other decompression block 74. The transmitters 71,72 subsequently encapsulate the received compressed voice signals into voice data packets, preferably including adding an RTP header with a timestamp, and transmit the packets to the appropriate participants. Assuming that the compressed voice signal corresponding to participant B arrives within the predetermined time T of the voice signal corresponding to participant A, the compressed voice signal of participants A and B are decompressed such that they are preferably in PCM format, mixed together, compressed, and subsequently encapsulated and transmitted to the other participants within the voice conference (those being participants C through Z), the encapsulation similarly including an RTP header with a timestamp in preferred embodiments. It is noted that the transmitters 71,72,79 together preferably comprise a single transmitting algorithm that is run for each of the participants in the voice conference.

Although the first preferred embodiment of the present invention is as described above with reference to FIGS. 4 through 7, this description is not meant to limit the scope of the present invention. Numerous alternatives are possible such as the removal of the predetermined time T step 106. This would result in the immediate generation of a secondary voice signal in the case that no such signal was previously saved. Further, although the first preferred embodiment describes the mixing of only the primary and secondary talkers, other embodiments could have the selection of more than two talkers and the subsequent mixing of all the selected voice signals. For such an alternative, a third talker could be selected which has its corresponding voice signals mixed with the primary voice signals, the result being sent to the secondary talker only, and mixed with the secondary voice signals, the result being sent to the primary talker only. This alternative could allow a third talker to notify the primary and/or secondary talker that he/she would like to speak. In this case, the other participants in the conference call would not hear the third talker until one of the primary and secondary talkers ceased speaking so that they would be de-selected as a talker.

There are numerous advantages to the packet-based central conference bridge according to the first preferred embodiment over the well-known conference bridge depicted in FIG. 3A. The selection of talkers (no talkers, a lone talker, or primary and secondary talkers) prior to the decompression of the voice signals reduces the required signal processing power and possibly the latency and transcoding for the overall conference bridge. In the case that there are no talkers or only a single lone talker, no decompression, mixing, and re-compression is required within the design according to the first preferred embodiment. If there are no talkers, no further processing after the talker selection algorithm is preferably performed. If there is only a lone talker, the compressed voice signal corresponding to the lone talker is simply encapsulated and transmitted to all the other participants within the voice conference with no transcoding and hence better signal quality. In both of these cases, the required signal processing power is significantly reduced due to lack of decompression and re-compression and, for the case of the lone talker, the latency of the conference bridge is further reduced and the signal quality is improved. If there are two or more speakers, and hence primary and secondary talkers selected by the talker selection algorithm, the required signal processing power can be reduced using the conference bridge according to the first preferred embodiment. This reduction in required DSP power results from not being required to decompress all incoming voice signals. In the conference bridge according to the first preferred embodiment, only voice signals corresponding to the primary and secondary talkers are decompressed. Further, the primary and secondary voice signals which are directly sent to the secondary and primary talkers respectively have similar advantages to the lone talker described above.

A further advantage of the first preferred embodiment results since the design depicted in FIGS. 4 through 7 requires no jitter buffers. The jitter buffers 38 within the well-known conference bridge design of FIG. 3A increases the latency of the conference bridge as well as increasing the required signal processing power for the overall conference bridge. With the design according to the first preferred embodiment no jitter buffers are necessary, hence reducing the latency and required signal processing power of the conference bridge by that caused by the jitter buffers.

Figure 8:
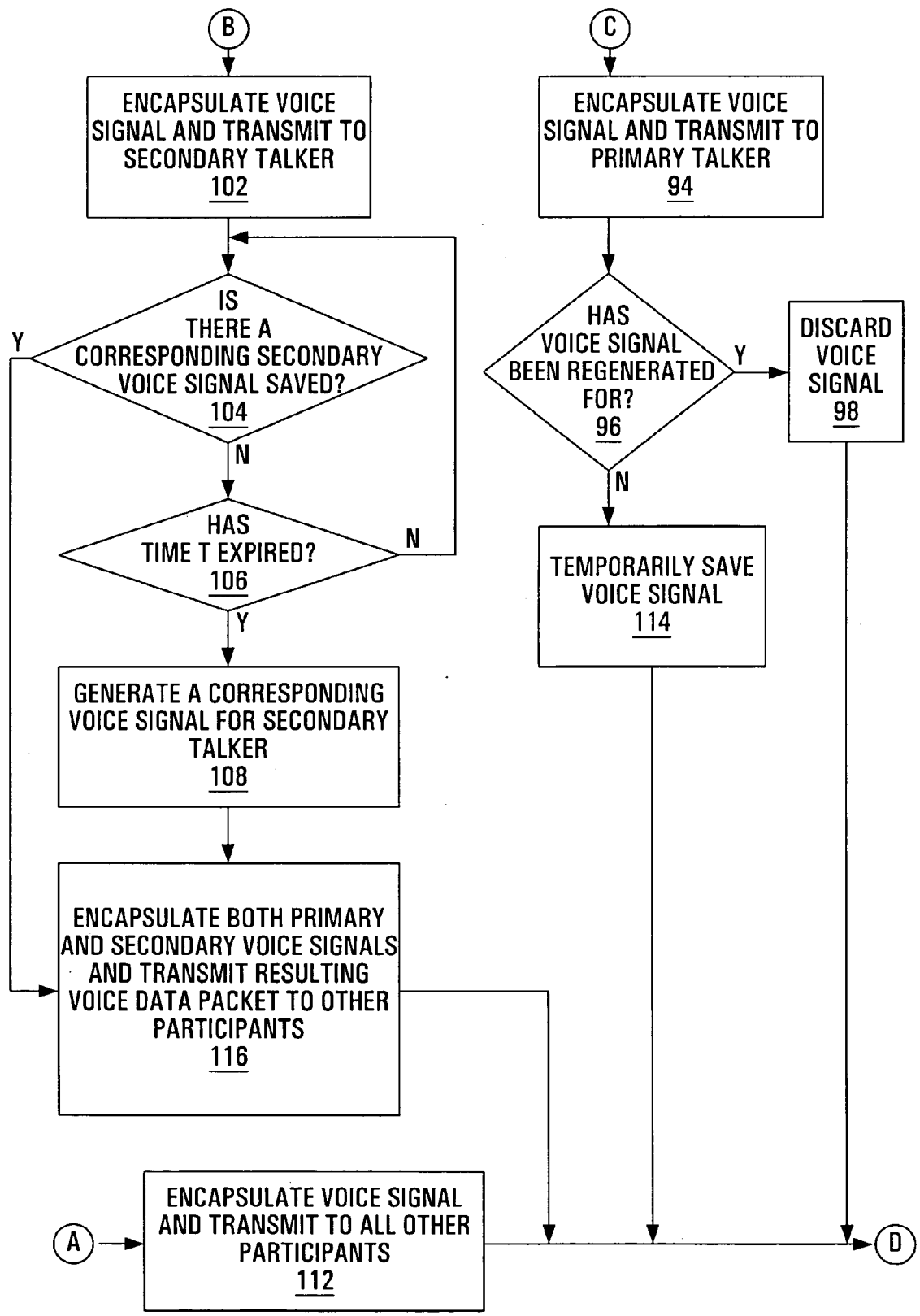
FIG. 8 is a flow chart illustrating the operations performed, according to the second preferred embodiment, by an output generator implemented within the packet-based central conference bridge of FIG. 4.

The packet-based central conference bridge according to the second preferred embodiment of the present invention will now be described with reference to FIGS. 8 and 9. As stated previously, the use of the conference bridge of the second preferred embodiment requires modified packet-based terminals and/or modified packet-based network interfaces to be used by the participants. As such, a description of a packet-based terminal and packet-based network interface according to the second preferred embodiment with reference to FIGS. 10 and 11 will follow the description of FIGS. 8 and 9.

The packet-based central conference bridge according to the second preferred embodiment, as previously described, is consistent with the simplified block diagram of FIG. 4. Further, the operation of the packet receipt block 50 and the energy detection and talker selection block 60 as depicted in the flow chart of FIG. 5 is consistent with the operation of these blocks within the conference bridge of the second preferred embodiment. The key difference between the conferencing control logic for the first and second preferred embodiments relates to the operation of the output generator 70, this difference being described herein below.

The procedure that occurs within the output generator 70, according to the second preferred embodiment, if the compressed voice signal corresponds to one of a lone talker, a primary talker, and a secondary talker will now be described with reference to FIG. 8. The flow chart of FIG. 8 is identical to the flow chart of FIG. 6 described herein above in detail with the exception of steps 100 and 110. In other words, steps 94 through 98, 102 through 108, and step 112 are identical for both the first and second preferred embodiments.

In the case that a compressed secondary voice signal is received at the output generator 70, the generator 70 proceeds through steps 94 and 96 as previously described. If the secondary voice signal had not previously been regenerated for at step 96, the voice signal is temporarily saved within the output generator 70 at step 114. The difference between step 100 (first preferred embodiment) and step 114 (second preferred embodiment) is the lack of a decompression operation within step 114. Once saved, the conferencing control logic returns to step 80 of FIG. 5.

In the case that a compressed primary voice signal is received at the output generator 70, the generator proceeds through steps 102 through 108 as previously described. If there was a secondary voice signal saved at step 104 or if a secondary voice signal was generated at step 108, the output generator proceeds through a number of operations as depicted at step 116. These operations include both the compressed primary and secondary voice signals being encapsulated within a packet format suitable for transmission on a packet-based network, this packet format preferably including an RTP header with a time stamp, and the resulting voice data packet(s) being transmitted to all the participants within the voice conference with the exception of the primary and secondary talkers. The encapsulation of the primary and secondary voice signals preferably entails placing the two signals within the same data section of a single packet with no mixing. The bandwidth efficiency of the voice communication system is increased using this technique when compared to an alternative in which the primary and secondary voice signals are transmitted in separate packet overheads. This increase in bandwidth efficiency is due to the large proportion of packet overhead bytes that are required within a typical packet format. Hence, only requiring a single packet overhead rather than two can significantly increase the bandwidth efficiency. Similar to the transmission in the first preferred embodiment, the transmission of these voice data packets is preferably a unicast transmission corresponding to each participant that is to receive the voice data packet or alternatively could be a single multicast transmission if the individual terminals can determine whether it should broadcast only one of the compressed voice signals (if the terminal is the primary or secondary talker) or both (if it is not the primary or secondary talker).

In the case that a compressed voice signal from a lone talker is received at the output generator 70 of the second preferred embodiment, the operation at step 112 is the same as previously described for the first preferred embodiment. In this case, the voice signal is encapsulated and transmitted to all the participants in the voice conference with the exception of the lone talker, this transmission being either one or more unicast transmissions or alternatively a single multicast transmission.

Figure 9:
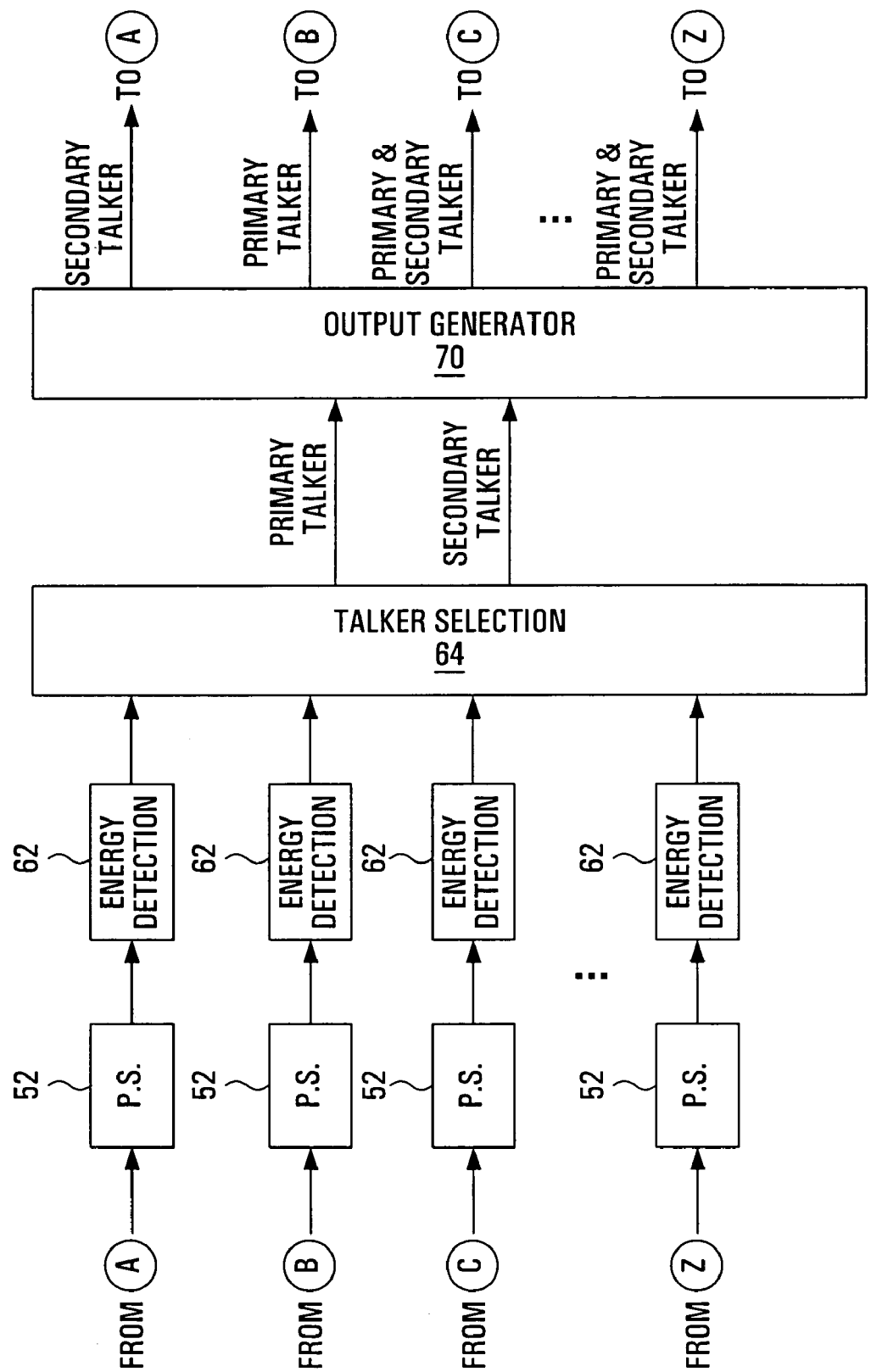
FIG. 9 is a logical block diagram illustrating the packet-based central conference bridge of FIG. 4 during a sample operation.

FIG. 9 is a logical block diagram that illustrates the functionality of the packet-based central conference bridge according to the second preferred embodiment in the case that the talker selection algorithm determines that there are two or more speakers and further selects primary and secondary talkers. In FIG. 9, the protocol stacks 52, energy detection blocks 62, and talker selection block 64 are identical to that described herein above for FIG. 7. The difference between FIGS. 7 and 9 resides within the output generator 70. Within FIG. 9, the output generator 70 receives voice signals from a primary talker and a secondary talker, in this case participants A and B respectively. As depicted in FIG. 9, the output generator 70 subsequently forwards the secondary voice signal to participant A, the primary voice signal to participant B, and both the primary and secondary voice signal to participants C through Z. Although not shown in FIG. 9, these voice signals are forwarded to the appropriate participants by encapsulating the voice signals and transmitting the resulting voice data packets to the appropriate participant via a packet-based network.

There are numerous alternatives to the packet-based central conference bridge according to the second preferred embodiment. For one, step 106 in which a primary voice signal is possibly delayed by a predetermined time T is removed in some embodiments, thus resulting in the immediate generation of a secondary voice signal in the case that there is no saved secondary voice signal during the arrival of a primary voice signal. Further, other alternative embodiments do not have the option of generating secondary voice signals or sending the primary and secondary signals within a single voice data packet. In these embodiments, upon the arrival of a primary voice signal, the output generator 70 simply encapsulates the signal and transmits the resulting voice data packet to all of the participants within the voice conference except the primary talker. The same operation is performed in the case that a secondary voice packet arrives at the output generator 70 except with the secondary talker being the only participant not to receive the corresponding voice data packet.

Yet further alternative embodiments have more than two participants selected as talkers, resulting in voice signals corresponding to more than two talkers being forwarded to the other participants within the voice conference. In one such alternative, a third talker is selected similar to that described for an alternative to the first preferred embodiment.

A packet-based terminal and a packet-based network interface that can operate with the packet-based central conference bridge of the second preferred embodiment are now described with reference to FIGS. 10 and 11. FIG. 10 is a simplified block diagram of a packet-based apparatus that can represent either the packet-based terminal or packet-based network interface according to the second preferred embodiment, this apparatus comprising a packet receipt block 120 and an output generator 130. FIG. 11 is a logical block diagram illustrating the packet-based apparatus of FIG. 10 in the case that a voice data packet containing both primary and secondary voice signals is received at the apparatus. In the case that a voice data packet containing a voice signal from a lone talker is received at the apparatus, a logical depiction of the packet-based terminal and packet-based network interface would be consistent with that depicted in FIG. 3B for a well-known packet-based terminal and packet-based network interface.

The packet receipt block 120 preferably receives a voice data packet containing one or two voice signals (one voice signal if from a lone talker or two voice signals if from primary and secondary talkers) from the packet-based central conference bridge of the second preferred embodiment.

The packet receipt block 120 performs a number of logical operations to the received packets as can be seen in FIG. 11 with respect to protocol stack 122 and jitter buffer 124. These blocks 122,124 have similar functionality to that previously described for the protocol stack 47 and the jitter buffer 48 respectively, both within FIG. 3B. Hence, when receiving voice data packets, the packet receipt block 120 strips the packet overhead from the voice data packets, leaving only the compressed voice signals; ensures that the compressed voice signals of the primary and secondary talkers are within the proper sequence (i.e. time ordering voice signals); buffers the compressed voice signals of the primary and secondary talkers to ensure smooth playback; and implements packet loss concealment. The first operation is preferably performed by the protocol stack 122 while the last three operations are preferably performed by the jitter buffers 124. In FIG. 11, these jitter buffers 124 are logically depicted as two jitter buffers despite preferably consisting of a single algorithm being run for the compressed voice signals of both the primary and secondary talkers. In fact, all of these operations are preferably algorithms running on one or more DSP devices, though alternatively they are performed by hard logic and/or discrete components. The end result of the operations within the packet receipt block 120 is the outputting of either one or two sets of compressed voice signals that are within the proper order.

The output generator 130 preferably receives these set(s) of compressed voice signals and processes them so that an uncompressed set of voice signals are sent to a speaker (not shown) in the case of the packet-based apparatus being a packet-based terminal or to a non-packet-based telephone terminal (not shown) such as a PCM terminal, via a non-packet-based telephone network (not shown) such as a PCM telephone network, in the case of the packet-based apparatus being a packet-based network interface. As can be seen within FIG. 11 for the case that two series of voice signals (primary and secondary) are received, the output generator 130 logically comprises two decompression blocks 132 and a mixer 134. In this case, the output generator 130 operates to decompress the compressed primary and secondary voice signals with decompression blocks 132, resulting in two streams of uncompressed voice signals (preferably PCM voice signals). Subsequently, these two streams of uncompressed voice signals are mixed to generate a set of voice signals that are output. Blocks 132,134 are preferably algorithms being run on one or more DSP devices, though alternatively they are operations performed by hard logic and/or discrete components. In the case that a single set of voice signals corresponding to a lone talker are received at the output generator, the voice signals are decompressed and forwarded.

There are alternative embodiments to the packet-based terminal and packet-based network interface of FIGS. 10 and 11, most of which are based off of alternative embodiments to the packet-based central conference bridge of the second preferred embodiment. In one alternative embodiment, all of the voice data packets being received by the packet receipt block 120 contain only one voice signal that corresponds to one of a primary talker, a secondary talker, or a lone talker. In this embodiment, an indication to the type of talker the voice signal corresponds is preferably included within the signals' packet overhead. Along with this indication, a time stamp preferably is also included in order to determine which primary and secondary voice signals correspond and hence should be mixed. Alternatively, another identification item could be used rather than time stamps to determine which primary and secondary voice signals should be mixed. Exemplary embodiments of this alternative allow for primary or secondary voice signals to be generated for in cases that they are not received at the packet-based terminal within a predetermined time interval of their respective secondary or primary voice signals.

In another alternative embodiment, the packet-based apparatus of FIGS. 10 and 11 could be expanded to receive and process more than just the voice signals from two talkers. This is preferable in the case that the packet-based apparatus is a packet-based network interface. Therefore, the packet-based network interface can operate as an interface between a packet-based network and a non-packet-based telephone network such as a PCM telephone network for a plurality of non-packet-based telephone terminals such as PCM telephone terminals.

There are numerous advantages of using the packet-based central conference bridge and packet-based apparatus according to the second preferred embodiment when within a voice conference. For one, similar advantages are found as stated above for the reduction in latency and required signal processing power with the removal of the jitter buffers within the conference bridge. As well, some of the other advantages of the first preferred embodiment also apply equally to the second preferred embodiment including the possible reduction in latency, transcoding and required signal processing power when selecting the talkers prior to decompressing the voice signals.

The second preferred embodiment is essentially the same as the first preferred embodiment except with the mixing of the primary and secondary voice signals being performed at the packet-based terminals and/or packet-based network interfaces rather than at the conference bridge. This change results in advantages and disadvantages for the voice communication system of the second preferred embodiment when compared to the system of the first preferred embodiment. One disadvantage with the moving of the mixing algorithm is that a plurality of packet-based terminals and packet-based network interfaces must perform the mixing rather than one central DSP within the conference bridge. Essentially, this will require an increase in the required signal processing power within all of the applicable packet-based terminals and packet-based network interfaces.

One advantage of the voice communication system of the second preferred embodiment over the voice communication system of the first preferred embodiment is the removal of any need to decompress and then subsequently compress again, that being transcoding as described previously. Decompression of the voice signals, as depicted in FIG. 7, is required prior to the mixing of the voice signals and compression is required prior to the transmission. In the conference bridge and terminal/network interface according to the second preferred embodiment, there is only one required decompression operation (that being at the terminals/network interfaces) and zero required compression operations. On the other hand, within the similar apparatuses of the first preferred embodiment, two decompression stages and one compression stage is necessary. This reduction in transcoding can directly lead to an increase in signal quality and a decrease in latency.

The overall effect of the above described lack of decompression and compression operations and the removal of the mixing operation, results in the central conference bridge according to the second preferred embodiment requiring less computational resources and therefore increased capacity in terms of ports. Simplicity of the conference bridge makes it more amenable to general purpose microprocessor devices, reducing the need for highly specialized DSPs that add significant costs. Therefore, the central conference bridge according to the second preferred embodiment does not have to be a specially designed apparatus but could be implemented within any device containing a microcontroller capable of running software operations, such as a server, a call processor, a router, or an end user personal computer.

Some of the key advantages of the second preferred embodiment relate to the possibility of making the packet-based central conference bridge relatively simple by moving the mixing operation to the packet-based terminals and/or packet-based network interfaces. This reduction in complexity within the conference bridges can allow for increased flexibility and operations when it comes to the use of these apparatuses.

Figure 12A:
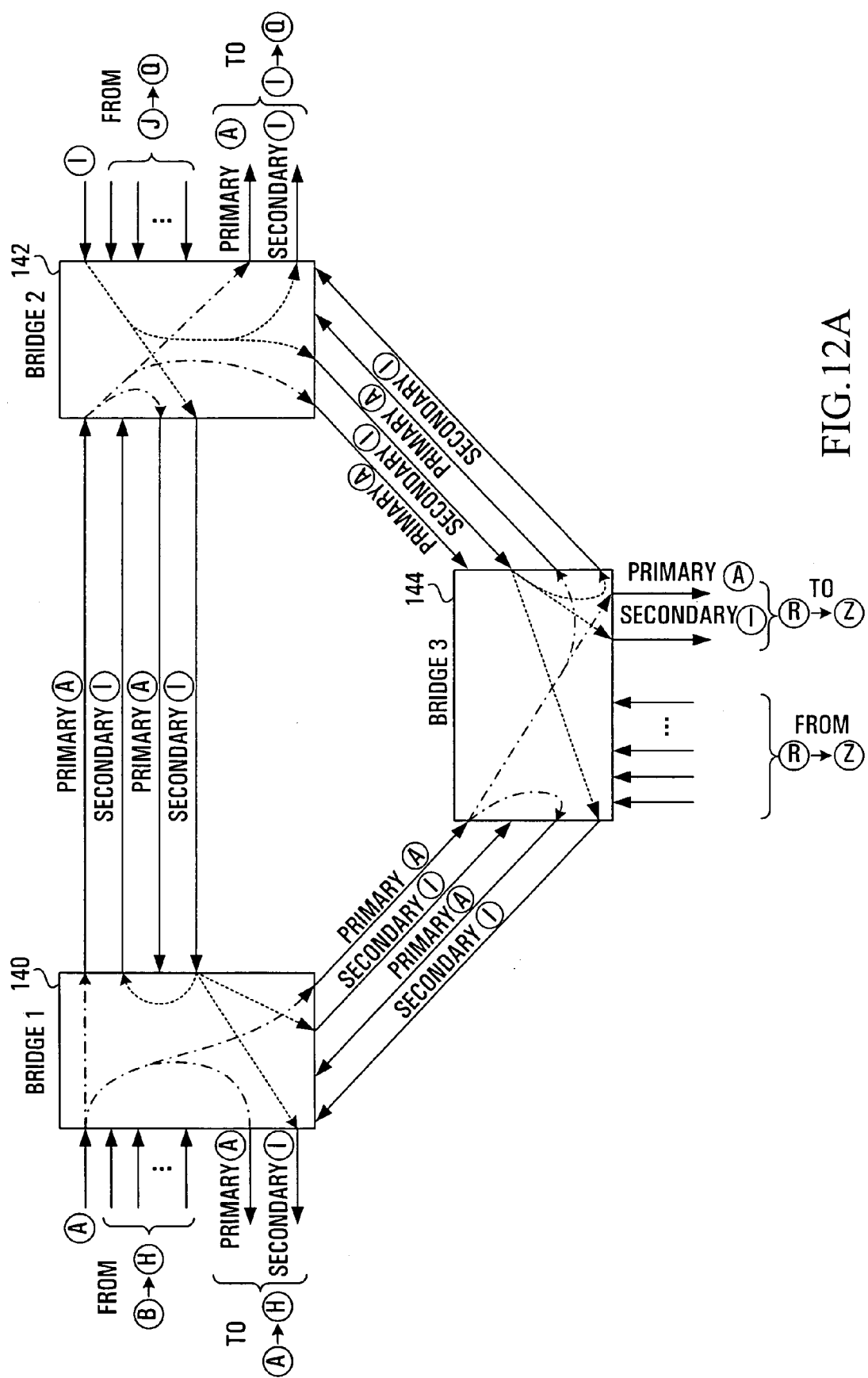
FIGS. 12A, 12B and 12C are block diagrams illustrating sample operations of a network comprising a series of interlocked packet-based central conference bridges according to an embodiment of the present invention.

One such additional operation concerns interlocking a plurality of conference bridges as will now be described with reference to FIGS. 12A through 12C. In these figures, first, second, and third packet-based central conference bridges 140,142,144 according to the second preferred embodiment are illustrated, each of the conference bridges being coupled to both of the other conference bridges. As depicted in FIG. 12A, each conference bridge 140,142,144 receives voice data packets corresponding to a subset of all the participants in a voice conference. In the case shown, the first, second, and third conference bridges 140,142,144 receive voice data packets from participants A through H, I through Q, and R through Z respectively. Further, each conference bridge also receives voice data packets corresponding to the primary and secondary talkers selected by the other conference bridges, these voice data packets containing the original source address of the participant. This setup potentially allows for a plurality of identical packets from a primary or secondary talker to arrive from different sources. In this case, the packets with the earliest arrival are preferably utilized, with the identical packets being discarded. It is preferably determined whether two packets are identical with a combination of the source address (which as stated above is maintained within packets being forwarded from one conference bridge to another) and by the packet sequence number or a time stamp within the packet such as the RTP time stamp.

As depicted in FIG. 12A, the first conference bridge 140 receives voice data packets corresponding to participants A through H and the voice data packets corresponding to the primary and secondary talkers selected by the second and third conference bridges 142,144. With all the received voice data packets (including those from the other conference bridges), each conference bridge removes all late arriving duplicate packets, as described above, and does an energy detection and talker selection operation, as described previously with reference to block 60, on the remaining packets. A change in the selected primary and secondary talkers at one conference bridge will change the voice data packets received at the other conference bridges, hence possibly changing the selection of talkers generated by the other conference bridges. In the case that all conference bridges have the same talker selection criteria, all of the conference bridges in equilibrium should have the same primary and secondary talkers selected.

As depicted in FIG. 12A, all three of the conference bridges 140,142,144 have selected participant A and participant I as the primary and secondary talkers respectively. This results in the first conference bridge 140 receiving the voice data packets of participant A from three different sources, those being direct from participant A and from both the second and third conference bridges 142,144, and receiving the voice data packets of participant I from two different sources, those being both the second and third conference bridges 142,144. As described previously, the first conference bridge 140 will utilize (for forwarding purposes) the packets being received from the best source, that being the source by which the packets arrive first. In the case shown in FIG. 12A, the first conference bridge 140 uses the packets of participant A directly received from participant A and the packets of participant I received from the second conference bridge 142. Alternatively, the packets of participant I received from the third conference bridge 144 could arrive first due to a problem, such as congestion, delaying the packets sent directly from the second conference bridge 142. In this case, the packets of participant I being sent from the second conference bridge 142 via the third conference bridge 144 would be utilized by the first conference bridge 140. It can be further seen in FIG. 12A that the second and third conference bridges 142,144 similarly select between identical packets (as determined by the source address and packet sequence numbers) from multiple sources when determining which packets to forward to the participants directly coupled to the particular conference bridge and further to forward to the other conference bridges. As with the first conference bridge 140, these conference bridges 142,144 select the packets with the earliest arrival. This ability to compensate for delays within the packet-based networks is one of the key advantages of this implementation.

Figure 12B:
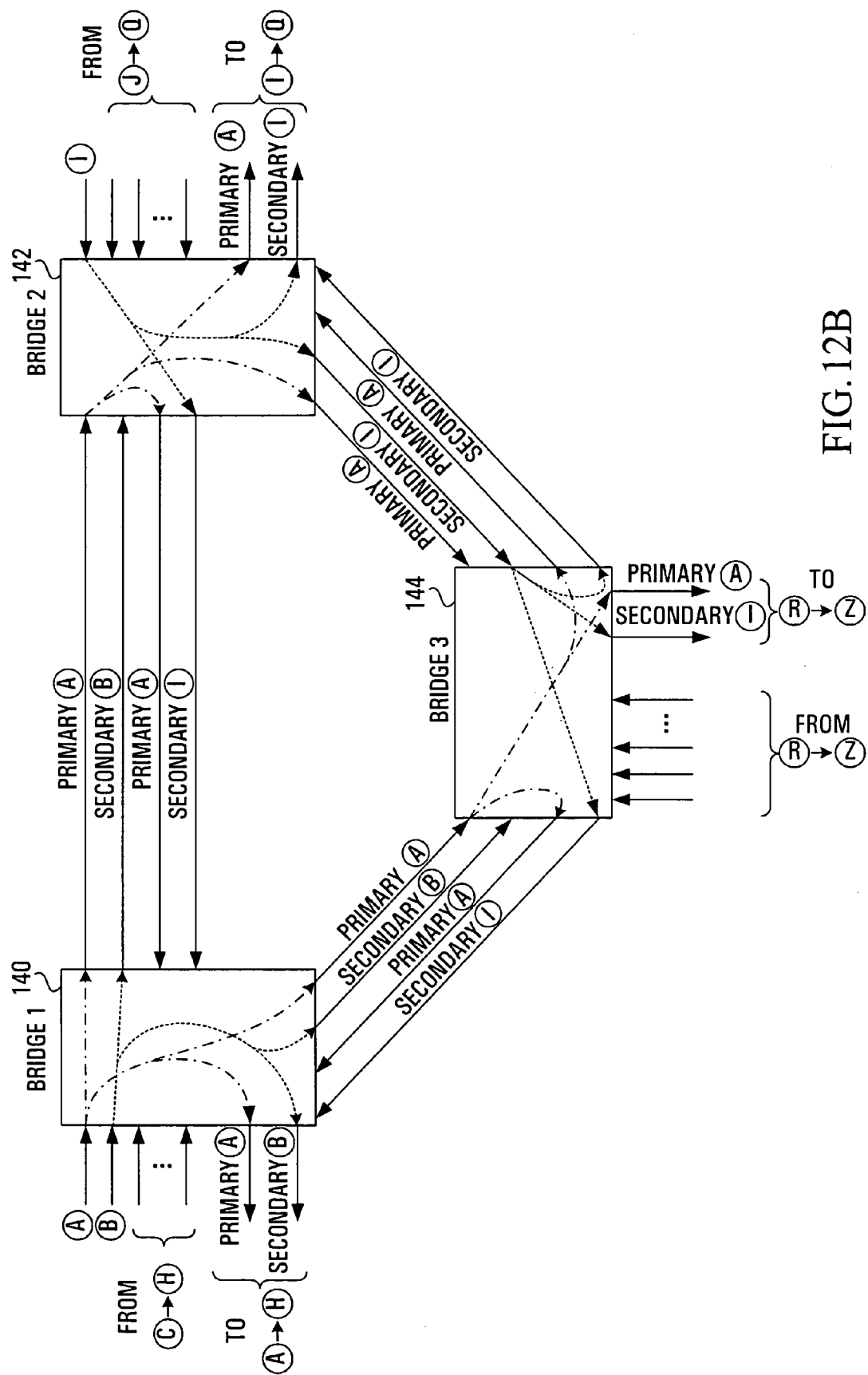
Figure 12C:
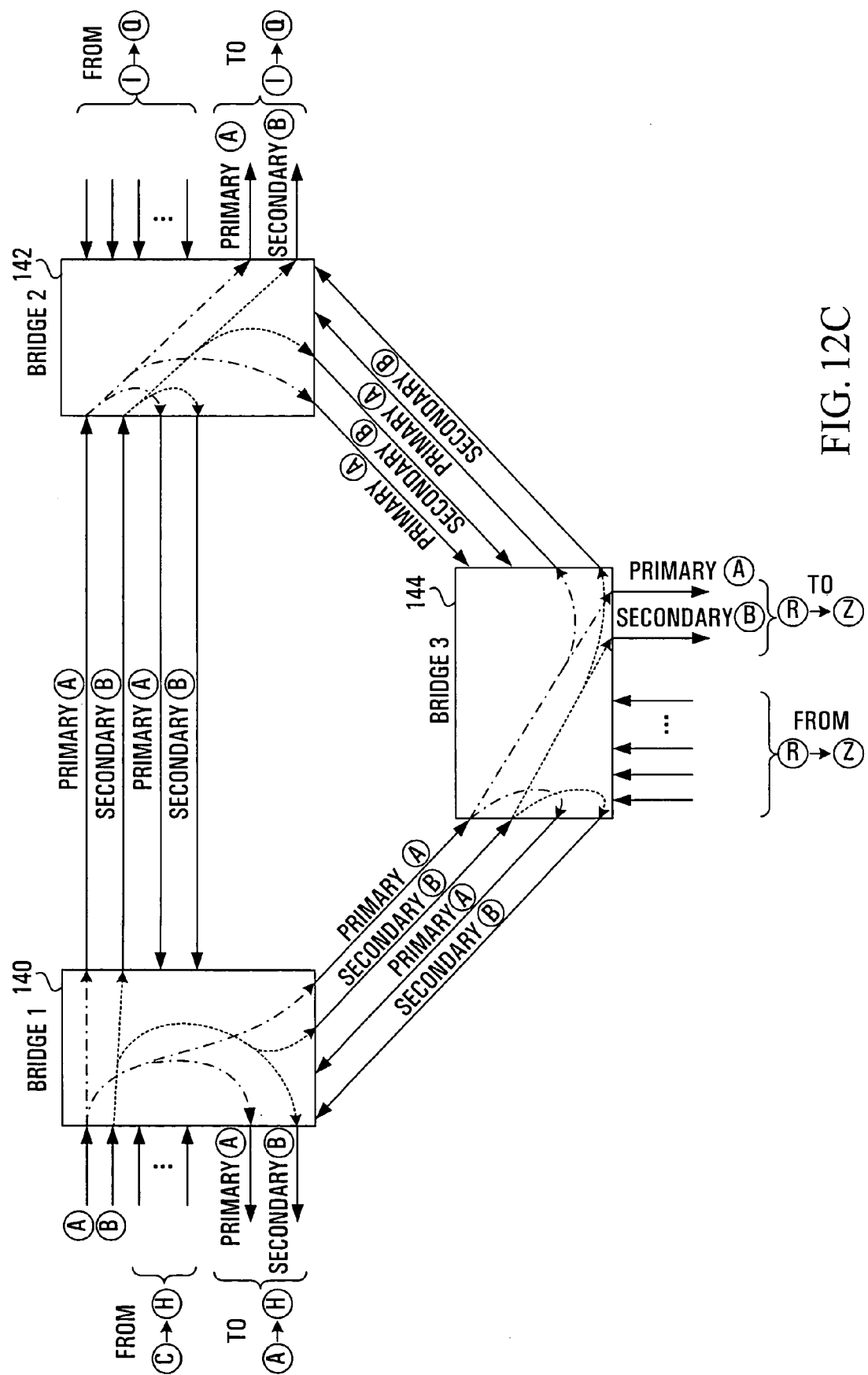

FIGS. 12B and 12C illustrate the network of interlocking conference bridges of FIG. 12A, but while in a change of secondary talkers. In FIG. 12B, the first conference bridge 140 is still receiving all of the signals described previously for FIG. 12A, but the talker selection operation within the first conference bridge has changed its selection concerning the secondary talker. Now, it has selected participant B as the secondary talker instead of participant I. The primary talker selection stays the same in this example. As depicted in FIG. 12B, the first conference bridge 140 begins to transmit the voice data packets of participant B to the other conference bridges 142,144, but the other conference bridges at this point still have participant I selected as the secondary talker. If the other conference bridges 142,144 utilize the same selection criteria as the first conference bridge 140, the other conference bridges 142,144 will eventually select participant B as the secondary talker as is depicted in FIG. 12C. This will return the system to equilibrium in which all of the participants in the voice conference can hear the same talkers.

There are a number of advantages to the interlocked conference bridge configuration of FIGS. 12A through 12C. One key advantage, as stated previously, is the ability of this configuration to compensate for delays in the packet-based network being used. This ability is caused by the possibility of conference bridges receiving identical packets from a plurality of sources and being able to select between them preferably based upon the earliest arrival.

Another key advantage that could occur with the use of interlocked conference bridges is a reduction in bandwidth requirements within the packet-based network when establishing voice conferences between participants in dispersed locations. In traditional conference bridges such as the one depicted in FIG. 3A, the voice packets corresponding to all of the participants must arrive at a single conference bridge. Using interlocked conference bridges of the second preferred embodiment, the participants within a voice conference can be divided into a plurality of sets of participants, each set of participants being coupled to a different conference bridge. The only communications between these interlocked conference bridges is with respect to packets from selected primary and secondary talkers. The advantage can be understood best by example. In the case depicted in FIG. 12A, if the participants A through H were based in Ottawa, Canada, participants I through Q were based in Santa Clara, Calif., and the participants R through Z were based in Richardson, Texas, the conference bridges 140,142,144 could be based in Ottawa, Santa Clara, and Richardson respectively. The only communications between these disperse cities would be with regard to the selected primary and secondary talkers. In previous implementations, the packets of all of these participants A through Z would have to be sent to a single conference bridge.

It is noted that it would not be possible for previous conference bridge designs, such as that depicted in FIG. 3A, to be implemented in an interlocked configuration. Firstly, the conference bridges within an interlocked design must not mix the voice signals corresponding to the primary and secondary talkers since this would not allow the other conference bridges to independently compare the primary and secondary talkers received form other conference bridges. Further, the latency associated with traversing one of these previously designed conference bridges typically results in unacceptable delays. In the interlocked design, voice data packets often traverse at least two conference bridges prior to being sent to a listener within the voice conference, hence increasing even further the problem of latency within these previous designs. The latency is not a critical problem using the conference bridges of the second preferred embodiment within an interlocked configuration because of the relatively low latency associated with each of the conference bridges independently.

Although the interlocked conference bridge configuration in FIGS. 12A through 12C depicts three conference bridges that have selected primary and secondary talkers, this is not meant to limit the scope of the present invention. For instance, more conference bridges or as few as two conference bridges could be interlocked. As well, in the case of a lone talker being selected within the voice conference, it should be understood that only a single packet would be sent to the other interlocked conference bridges. Further, it should be understood that the interlocked configuration could be used by conference bridges that select more than two talkers, with all of the packets associated with selected talkers being forwarded to the other conference bridges of the voice conference. Yet further, the conference bridge does not necessarily have to receive voice data packets from individual packet-based terminals or packet-based network interfaces but could only receive voice data packets selected by other conference bridges to be talkers.

There are large numbers of yet further possible alternative embodiments to the interlocked configuration described herein above, many of which have yet further additional advantages. One such alternative has the conference bridges prevent the re-forwarding of identical packets back to the best (earliest arriving) source of the particular voice data packets. Hence, if a conference bridge has voice data packets arriving from another interlocked conference bridge which are subsequently selected as the earliest arriving packets corresponding to the primary or secondary talker, the particular packets are not forwarded back to the conference bridge source in this alternative. This alternative effectively reduces the amount of voice data packets being exchanged between the conference bridges, hence decreasing the load on the packet-based network.

Another alternative embodiment of the interlocked configuration depicted in FIG. 12A has at least one of the interlocked conference bridges sending the voice data packets corresponding to its selected primary and secondary talkers to less than all of the other interlocked conference bridges. This setup can be used to reduce the number of packets traversing a bandwidth sensitive link such as links across the Atlantic. For instance, a voice conference of 100 participants in North America could be connected to a voice conference of 100 participants in Europe with the only connection being between two conference bridges that are further interlocked with a plurality of other conference bridges in their respective continents. This can result in the exchanging of voice data packets corresponding to their respective selected primary and secondary talkers being the only required transmissions over the Atlantic link. The trade-off to this configuration is possibly a slight increase in the latency due to some voice data packets possibly having to traverse more conference bridges to reach all of the other conference bridges in the voice conference.

Yet further, other alternative embodiments to the interlocked conference bridge configuration of FIGS. 12A through 12C, have the conference bridges interconnected within a large variety of configurations rather than a loop. In one case, the conference bridges are coupled in series with each conference bridge forwarding the voice data packets corresponding to its determined primary and secondary talkers to the conference bridge on either side of it. In another alternative configuration, the conference bridges are coupled to a central conference bridge so that the conferences bridges essentially form a star. A large number of other configurations can be considered with the key consideration being the latency that would be required if the primary or secondary talkers were a large number of "hops" from other conference bridges within the interconnected network. It is noted that in preferred embodiments, the latency problem is not significant until a voice data packet must traverse a large number of conference bridges.

Another additional operation that is possible with the use of conference bridges according to the second preferred embodiment is the defining of all packet-based voice communications as a conference session, whether there are two participants or hundreds. In this design, all voice data packets within a packet-based network traverse a conference bridge with each participant treated independently at the conference bridge. This allows each packet-based voice session, whether point-to-point or a conference situation, to have a control mechanism operated with the use of conference bridges. This can allow for additional functionality within the control plane of a typical telephone session such as allowing participants to join the telephone session without having to be initiated by a current participant, essentially giving the initiation control to a new participant. This is useful for people who-wish to make a quick comment to one of the participants or for people who wish to join the conference session while it is in progress. For instance, one participant in a conference session could suggest to another person to join the conference session when he/she gets a chance, the person in this case is able to join at his/her will without disturbing the other participants. Additionally, the flexibility of the second preferred embodiment allows for a voice conference to expand from a point-to-point voice communication to a larger conference session with ease, as every packet-based voice communication is easily scalable in this setup.

Yet another additional operation that is possible with the use of packet-based terminals or packet-based network interfaces of the second preferred embodiments is the ability to perform three way voice conferencing without the use of a central conference bridge. In the case of three participants within a voice conference, the central conference bridge of the second preferred embodiment can be seen to be performing an unnecessary function since the selection of talkers is not necessary in the case that the packet-based terminals and/or packet-based network interfaces can mix the voice signals from two sources, that being the maximum number of sources that the apparatus could possibly receive voice data packets from at one time if only three participants are in the voice conference.

Overall the present invention as described herein above has considerable advantages over the well-known voice conferencing techniques. These embodiments as described allow for the operations within the central conference bridge to have decreased latency, decreased computational requirements, and an increased signal quality due to a reduction in transcoding.

There are a number of features that can be added to any one of the above embodiments of the present invention that have not previously been discussed in detail. For one, a modified control plane is used such that a number of operations could be controlled with the transmission of control packets between participants and possibly a moderator. One such operation could have a moderator established as a permanent talker throughout the voice conference, possibly as a permanent secondary talker or possibly as a third selected talker. Another operation that could be controlled through use of a modified control plane is the manual selection of primary and/or secondary talkers. This may be useful in cases where a particular participant is scheduled to speak. Yet another possible operation that could be maintained with use of a modified control plane is a sidebar operation. In a sidebar operation, at least two of the participants within a voice conference can form a subset of participants smaller than the set that defines the entire voice conference. With this setup, one participant within the subset can choose to communicate with the entire voice conference or with only the members of the subset.

Another feature that could be added to any one of the embodiments of the present invention described herein above is the sending of video streams via video data packets within the packet-based network. In these embodiments, the video data packets would replace or supplement the voice data packets within the above described implementations. The operation of embodiments with this feature would operate the same as described herein above with these video signals preferably corresponding to the primary talker. Alternatively, a manual control within the control plane could be added so that each participant or a moderator could select which video stream to view. Further, a picture-in-picture feature could be used such that two or more video streams could be shown at once. In the case of there being primary and secondary talkers, the picture-in-picture operation could be equivalent to the mixing of the corresponding voice signals.

In general, although the operation of the present invention was described herein above with use of the terms voice data packets and voice signals, these packets and signals can be referred to broadly as media data packets and media signals respectively. In this case, media data packets are any data packets that are transmitted via the media plane, these media data packets preferably being either audio or audio/video data packets. It is noted that use of the term voice data packets above is specific to the preferred embodiments in which the audio signals are voice. Further, it should be understood that video data packets may incorporate audio data packets.

Although the present invention herein above described has a single voice conference being established with the use of a central conference bridge, it should be understood that the central conference bridge would preferably be capable of handling a plurality of voice conferences simultaneously.

Persons skilled in the art will appreciate that there are yet more alternative implementations and modifications possible for implementing the present invention, and that the above implementation is only an illustration of this embodiment of the invention. The scope of the invention, therefore, is only to be limited by the claims appended hereto.

We claim:

1. A conference bridge, comprising:
  a receiver capable of being coupled to a network, said receiver to receive at least one media data packet from at least two sources forming a media conference, each media data packet comprising a compressed media signal and packet overhead, wherein the receiver removes the packet overhead;
  an energy detection and talker selection unit coupled to said receiver to:
    determine at least one speech parameter corresponding to each of the compressed media signals; and
    select a set of the sources within the media conference as talkers based on the determined speech parameters.

2. A conference bridge according to claim 1, wherein the media data packets are audio data packets and the compressed media signals defined by the media data packets are compressed audio signals.

3. A conference bridge according to claim 2, wherein the speech parameter corresponding to each of the compressed media signals is a number of bytes within each of the compressed media signals.

4. A conference bridge according to claim 2, wherein the speech parameter corresponding to each of the compressed media signals is a pitch value within each of the compressed media signals.

5. A conference bridge according to claim 2, wherein the speech parameter corresponding to each of the compressed media signals is an energy level corresponding to each of the compressed media signals.

6. A conference bridge according to claim 1, wherein the media data packets are audio/video data packets and the compressed media signals defined by the media data packets are compressed audio/video signals.

7. A conference bridge according to claim 1, wherein to select a set of the sources within the media conference as talkers, the energy detection and talker selection unit operates, for each of the received compressed media signals, to:
  determine whether the compressed media signal contains speech based on the corresponding speech parameter;
  if determined that the compressed media signal contains speech, determine whether the compressed media signal corresponds to a previously selected talker; and
  if determined that the compressed media signal does not correspond to a previously selected talker, determine whether a maximum number of talkers parameter is met, discard the compressed media signal in the case that the maximum number of talkers parameter is met and select the source corresponding to the compressed media signal as a talker within the media conference in the case that the maximum number of talkers parameter is not met.

8. A conference bridge according to claim 1 further comprising an output unit coupled to the energy detection and talker selection unit, the output unit, for each of the received compressed media signals, to:

determine whether the compressed media signal corresponds to a talker within the media conference; and if determined that the compressed media signal corresponds to a talker, encapsulate the compressed media signal and output the encapsulated compressed media signal to the sources within the media conference except the source corresponding to the compressed media signal.

9. A conference bridge according to claim 1, wherein the set of the sources within the media conference selected as talkers comprises one of first and second sources selected within the media conference as primary and secondary talkers respectively, one of the sources selected within the media conference as a lone talker, and none of the sources selected within the media conference as a talker.

10. A conference bridge according to claim 9 further comprising an output unit coupled to the energy detection and talker selection unit that operates, for each of the received compressed media signals, to:

determine whether the compressed media signal corresponds to the lone talker within the media conference; and if determined that the compressed media signal corresponds to the lone talker, encapsulate the compressed media signal and output the encapsulated compressed media signal to the sources within the media conference except the source corresponding to the compressed media signal.

11. A conference bridge according to claim 9 further comprising an output unit coupled to the energy detection and talker selection unit that operates, for each of the received compressed media signals, to:

determine whether the compressed media signal corresponds to one of the primary and secondary talkers within the media conference; and if determined that the compressed media signal corresponds to one of the primary and secondary talkers, encapsulate the compressed media signal and output the encapsulated compressed media signal to the sources within the media conference except the source corresponding to the compressed media signal.

12. A conference bridge according to claim 9 further comprising an output unit coupled to the energy detection and talker selection unit that operates, for each of the received compressed media signals, to:

determine whether the compressed media signal corresponds to the secondary talker within the media conference; and if determined that the compressed media signal corresponds to the secondary talker, encapsulate the compressed media signal, output the encapsulated compressed media signal to the primary talker within the media conference, determine whether the compressed media signal has been generated for previously, save the compressed media signal if not previously generated for; and discard the compressed media signal if previously generated for.

13. A conference bridge according to claim 9 further comprising an output unit coupled to the energy detection and talker selection unit that operates, for each of the received compressed media signals, to:

determine whether the compressed media signal corresponds to the secondary talker within the media conference; and if determined that the compressed media signal corresponds to the secondary talker, encapsulate the compressed media signal, output the encapsulated compressed media signal to the primary talker within the media conference, determine whether the compressed media signal has been generated for previously; if not previously generated for, decompress the compressed media signal, resulting in a secondary media signal, and save the secondary media signal; and discard the compressed media signal if previously generated for.

14. A conference bridge according to claim 9 further comprising an output unit coupled to the energy detection and talker selection unit that operates, for each of the received compressed media signals, to:

determine whether the compressed media signal corresponds to the primary talker within the media conference; and if determined that the compressed media signal corresponds to the primary talker, encapsulate the compressed media signal; output the encapsulated compressed media signal to the secondary talker within the media conference; decompress the compressed media signal, resulting in a primary media signal; determine whether a corresponding secondary media signal is saved; if a corresponding secondary media signal is not saved, generate a secondary media signal; mix the primary and secondary media signals into a single combined media signal; encapsulate the combined media signal; and output the encapsulated combined media signal to the sources within the media conference except the primary and secondary talkers.

15. A conference bridge according to claim 14, wherein the output unit further operates to decompress the secondary media signal prior to mixing it with the primary media signal if the secondary media signal is saved only in compressed form.

16. A conference bridge according to claim 9 further comprising an output unit coupled to the energy detection and talker selection unit that operates, for each of the received compressed media signals, to:

determine whether the compressed media signal corresponds to the primary talker within the media conference; and if determined that the compressed media signal corresponds to the primary talker, encapsulate the compressed media signal; output the encapsulated compressed media signal to the secondary talker within the media conference; decompress the compressed media signal, resulting in a primary media signal; determine whether a corresponding secondary media signal is saved; if a corresponding secondary media signal is not saved, monitor for receipt of a media data packet from the secondary talker for a predetermined time period; if the predetermined time period expires and no media data packet corresponding to the secondary talker has been received, generate a secondary media signal; mix the primary and secondary media signals into a single combined media signal; encapsulate the combined media signal; and output the encapsulated combined media signal to the sources within the media conference except the primary and secondary talkers.

17. A conference bridge according to claim 9 further comprising an output unit coupled to the energy detection and talker selection unit that operates, for each of the received compressed media signals, to:

determine whether the compressed media signal corresponds to the primary talker within the media conference; and if determined that the compressed media signal corresponds to the primary talker, encapsulate the compressed media signal; output the encapsulated compressed media signal to the secondary talker within the media conference; determine whether a corresponding compressed media signal associated with the secondary talker is saved; if a corresponding compressed media signal associated with the secondary talker is not saved, generate a compressed media signal for the secondary talker; encapsulate the compressed media signals corresponding to the primary and secondary talkers into a combined media data packet; and output the combined media data packet to the sources within the media conference except the primary and secondary talkers.

18. A conference bridge according to claim 9 further comprising an output unit coupled to the energy detection and talker selection unit that operates, for each of the received compressed media signals, to:

determine whether the compressed media signal corresponds to the primary talker within the media conference; and if determined that the compressed media signal corresponds to the primary talker, encapsulate the compressed media signal; output the encapsulated compressed media signal to the secondary talker within the media conference; determine whether a corresponding compressed media signal associated with the secondary talker is saved; if a corresponding compressed media signal associated with the secondary talker is not saved, monitor for receipt of a media data packet from the secondary talker for a predetermined time period; if the predetermined time period expires and no media data packet corresponding to the secondary talker has been received, generate a compressed media signal for the secondary talker; encapsulate the compressed media signals corresponding to the primary and secondary talkers into a combined media data packet; and output the combined media data packet to the sources within the media conference except the primary and secondary talkers.

19. A conference bridge according to claim 1, wherein the set of the sources within the media conference selected as talkers comprises one of first, second and third sources selected within the media conference as primary, secondary and tertiary talkers, first and second sources selected within the media conference as primary and secondary talkers respectively, one of the sources selected within the media conference as a lone talker, and none of the sources selected within the media conference as a talker.

20. A conference bridge according to claim 19 further comprising an output unit coupled to the energy detection and talker selection unit that operates, for each of the received compressed media signals, to:

determine whether the compressed media signal corresponds to the tertiary talker within the media conference; and if determined that the compressed media signal corresponds to the tertiary talker, encapsulate the compressed media signal and output the encapsulated compressed media signal to the primary and secondary talkers within the media conference.

21. A conference bridge according to claim 19 further comprising an output unit coupled to the energy detection and talker selection unit that operates, for each of the received compressed media signals, to:

determine whether the compressed media signal corresponds to the tertiary talker within the media conference; and if determined that the compressed media signal corresponds to the tertiary talker, decompress the compressed media signal, resulting in a tertiary media signal; save the tertiary media signal; separately mix the tertiary media signal with primary and secondary media signals to generate a first mixed media signal and a second mixed media signal respectively; encapsulate the first and second mixed media signals; and output the first and second mixed media signals to the secondary and primary talkers respectively within the media conference.

22. A conference bridge, comprising conferencing control logic to:

receive at least one media data packet from at least two sources forming a media conference, each media data packet comprising a compressed media signal and packet overhead;

remove the packet overhead;

determine at least one speech parameter corresponding to each of the compressed media signals; and select a set of the sources within the media conference as talkers based on the determined speech parameters.

23. A method for selecting a set of talkers within a media conference, comprising:

receiving at least one media data packet from at least two sources forming a media conference, each media data packet comprising a compressed media signal and packet overhead;

removing the packet overhead;

determining at least one speech parameter corresponding to each of the compressed media signals; and selecting a set of the sources within the media conference as talkers based on the determined speech parameters.

24. A method according to claim 23, wherein the media data packets are audio data packets and the compressed media signals defined by the media data packets are compressed audio signals.

25. A method according to claim 24, wherein the speech parameter corresponding to each of the compressed media signals is a number of bytes within each of the compressed media signals.

26. A method according to claim 24, wherein the speech parameter corresponding to each of the compressed media signals is a pitch value within each of the compressed media signals.

27. A method according to claim 24, wherein the speech parameter corresponding to each of the compressed media signals is an energy level corresponding to each of the compressed media signals.

28. A method according to claim 23, wherein the media data packets are audio/video data packets and the compressed media signals defined by the media data packets are compressed audio/video signals.

29. A method according to claim 23, wherein said selecting a set of the sources within the media conference as talkers comprises, for each of the received compressed media signals:

determining whether the compressed media signal contains speech based on the corresponding speech parameter;

determining whether the compressed media signal corresponds to a previously selected talker if determined that the compressed media signal contains speech;
determining whether a maximum number of talkers parameter is met if determined that the compressed media signal does not correspond to a previously selected talker;
discarding the compressed media signal in the case that the maximum number of talkers parameter is met; and
selecting the source corresponding to the compressed media signal as a talker within the media conference in the case that the maximum number of talkers parameter is not met.

30. A method according to claim 23 further comprising, for each of the received compressed media signals:
determining whether the compressed media signal corresponds to a talker within the media conference; and
if determined that the compressed media signal corresponds to a talker, encapsulating the compressed media signal and outputting the encapsulated compressed media signal to the sources within the media conference except the source corresponding to the compressed media signal.

31. A method according to claim 23, wherein the set of the sources within the media conference selected as talkers comprises one of first and second sources selected within the media conference as primary and secondary talkers respectively, one of the sources selected within the media conference as a lone talker, and none of the sources selected within the media conference as a talker.

32. A method according to claim 31 further comprising, for each of the received compressed media signals:
determining whether the compressed media signal corresponds to the lone talker within the media conference; and
if determined that the compressed media signal corresponds to the lone talker, encapsulating the compressed media signal and outputting the encapsulated compressed media signal to the sources within the media conference except the source corresponding to the compressed media signal.

33. A method according to claim 31 further comprising, for each of the received compressed media signals:
determining whether the compressed media signal corresponds to one of the primary and secondary talkers within the media conference; and
if determined that the compressed media signal corresponds to one of the primary and secondary talkers, encapsulating the compressed media signal and outputting the encapsulated compressed media signal to the sources within the media conference except the source corresponding to the compressed media signal.

34. A method according to claim 31 further comprising, for each of the received compressed media signals:
determining whether the compressed media signal corresponds to the secondary talker within the media conference; and
if determined that the compressed media signal corresponds to the secondary talker, encapsulating the compressed media signal, outputting the encapsulated compressed media signal to the primary talker within the media conference, determining whether the compressed media signal has been generated for previously, saving the compressed media signal if not previously generated for; and discarding the compressed media signal if previously generated for.

35. A method according to claim 31 further comprising, for each of the received compressed media signals:
determining whether the compressed media signal corresponds to the secondary talker within the media conference; and
if determined that the compressed media signal corresponds to the secondary talker, encapsulating the compressed media signal, outputting the encapsulated compressed media signal to the primary talker within the media conference, determining whether the compressed media signal has been generated for previously; if not previously generated for, decompressing the compressed media signal, resulting in a secondary media signal, and saving the secondary media signal; and, if previously generated for, discarding the compressed media signal.

36. A method according to claim 31 further comprising, for each of the received compressed media signals:
determining whether the compressed media signal corresponds to the primary talker within the media conference; and
if determined that the compressed media signal corresponds to the primary talker, encapsulating the compressed media signal; outputting the encapsulated compressed media signal to the secondary talker within the media conference; decompressing the compressed media signal, resulting in a primary media signal; determining whether a corresponding secondary media signal is saved; if a corresponding secondary media signal is not saved, generating a secondary media signal; mixing the primary and secondary media signals into a single combined media signal; encapsulating the combined media signal; and outputting the encapsulated combined media signal to the sources within the media conference except the primary and secondary talkers.

37. A method according to claim 36 further comprising decompressing the secondary media signal prior to mixing it with the primary media signal if the secondary media signal is saved only in compressed form.

38. A method according to claim 31 further comprising, for each of the received compressed media signals:
determining whether the compressed media signal corresponds to the primary talker within the media conference; and
if determined that the compressed media signal corresponds to the primary talker, encapsulating the compressed media signal; outputting the encapsulated compressed media signal to the secondary talker within the media conference; decompress the compressed media signal, resulting in a primary media signal; determining whether a corresponding secondary media signal is saved; if a corresponding secondary media signal is not saved, monitoring for receipt of a media data packet from the secondary talker for a predetermined time period; if the predetermined time period expires and no media data packet corresponding to the secondary talker has been received, generating a secondary media signal; mixing the primary and secondary media signals into a single combined media signal; encapsulating the combined media signal; and outputting the encapsulated combined media signal to the sources within the media conference except the primary and secondary talkers.

39. A method according to claim 31 further comprising, for each of the received compressed media signal:

determining whether the compressed media signal corresponds to the primary talker within the media conference; and if determined that the compressed media signal corresponds to the primary talker, encapsulating the compressed media signal; outputting the encapsulated compressed media signal to the secondary talker within the media conference; determining whether a corresponding compressed media signal associated with the secondary talker is saved; if a corresponding compressed media signal associated with the secondary talker is not saved, generating a compressed media signal for the secondary talker; encapsulating the compressed media signals corresponding to the primary and secondary talkers into a combined media data packet; and outputting the combined media data packet to the sources within the media conference except the primary and secondary talkers.

40. A method according to claim 31 further comprising, for each of the received compressed media signals:

determining whether the compressed media signal corresponds to the primary talker within the media conference; and if determined that the compressed media signal corresponds to the primary talker, encapsulating the compressed media signal; outputting the encapsulated compressed media signal to the secondary talker within the media conference; determining whether a corresponding compressed media signal associated with the secondary talker is saved; if a corresponding compressed media signal associated with the secondary talker is not saved, monitoring for receipt of a media data packet from the secondary talker for a predetermined time period; if the predetermined time period expires and no media data packet corresponding to the secondary talker has been received, generating a compressed media signal for the secondary talker; encapsulating the compressed media signals corresponding to the primary and secondary talkers into a combined media data packet; and outputting the combined media data packet to the sources within the media conference except the primary and secondary talkers.

41. A method according to claim 23, wherein the set of the sources within the media conference selected as talkers comprises one of first, second and third sources selected within the media conference as primary, secondary and tertiary talkers, first and second sources selected within the media conference as primary and secondary talkers respectively, one of the sources selected within the media conference as a lone talker, and none of the sources selected within the media conference as a talker.

42. A method according to claim 41 further comprising, for each of the received compressed media signals:

determining whether the compressed media signal corresponds to the tertiary talker within the media conference; and if determined that the compressed media signal corresponds to the tertiary talker, encapsulating the compressed media signal and outputting the encapsulated compressed media signal to the primary and secondary talkers within the media conference.

43. A method according to claim 41 further comprising, for each of the received compressed media signals:

determining whether the compressed media signal corresponds to the tertiary talker within the media conference; and if determined that the compressed media signal corresponds to the tertiary talker, decompressing the compressed media signal, resulting in a tertiary media signal; saving the tertiary media signal; separately mixing the tertiary media signal with primary and secondary media signals to generate a first mixed media signal and a second mixed media signal respectively; encapsulating the first and second mixed media signals; and outputting the first and second mixed media signals to the secondary and primary talkers respectively within the media conference.

44. A conference bridge, comprising:

means for receiving at least one media data packet from at least two sources forming a media conference, each media data packet comprising a compressed media signal and packet overhead;

means for removing the packet overhead;

means for determining at least one speech parameter corresponding to each of the compressed media signals; and means for selecting a set of the sources within the media conference as talkers based on the determined speech parameters.

45. A conference bridge according to claim 44 further comprising:

means for generating media data packets corresponding to the compressed media signals received from at least one of the sources selects as a talker; and means for outputting the generated media data packets.

46. A conference bridge, comprising:

a receiver capable of being coupled to a network, said receiver to receive at least one media data packet from at least two sources forming a media conference, each media data packet comprising a compressed media signal and packet overhead, wherein the receiver removes the packet overhead;

an energy detection and talker selection unit coupled to said receiver to process the received compressed media signals including selecting a set of the sources within the media conference as talkers, one of the talkers being a lead talker; and an output unit coupled to the energy detection and talker selection unit to output media data packets that correspond to compressed media signals received from the talkers; and wherein the media data packets corresponding to the lead talker are always output from the conference bridge in the same order as the media data packets which are received from the lead talker.

47. A conference bridge according to claim 46, wherein the media data packets are audio data packets and the compressed media signals within each of the media data packets are compressed audio signals.

48. A conference bridge according to claim 46, wherein each of the media data packets received from the sources comprises a time stamp; and wherein the receiver operates further to save the time stamps corresponding to the media data packets received from the lead talker and the output unit operates further to insert the saved time stamps within the corresponding media data packets output from the conference bridge.

49. A conference bridge according to claim 46, wherein to process the received compressed media signals, the energy detection and talker selection unit operates to determine at least one speech parameter associated with each of the compressed media signals and select a set of the packet-based terminals within the media conference as talkers based upon the determined speech parameters.

50. A conference bridge according to claim 49, wherein the set of the sources within the media conference selected as talkers comprises one of first and second sources selected within the media conference as primary and secondary talkers respectively, one of the sources selected within the media conference as a lone talker, and none of the sources selected within the media conference as a talker.

51. A conference bridge according to claim 50 further comprising an output unit coupled to the energy detection and talker selection unit that operates, for each of the received compressed media signals, to:
   determine whether the compressed media signal corresponds to the lone talker within the media conference; and
   if determined that the compressed media signal corresponds to the lone talker, encapsulate the compressed media signal and output the encapsulated compressed media signal to the sources within the media conference except the source corresponding to the compressed media signal.

52. A conference bridge according to claim 50 further comprising an output unit coupled to the energy detection and talker selection unit that operates, for each of the received compressed media signals, to:
   determine whether the compressed media signal corresponds to one of the primary and secondary talkers within the media conference; and
   if determined that the compressed media signal corresponds to one of the primary and secondary talkers, encapsulate the compressed media signal and output the encapsulated compressed media signal to the sources within the media conference except the source corresponding to the compressed media signal.

53. A conference bridge according to claim 50 further comprising an output unit coupled to the energy detection and talker selection unit that operates, for each of the received compressed media signals, to:
   determine whether the compressed media signal corresponds to the secondary talker within the media conference; and
   if determined that the compressed media signal corresponds to the secondary talker, encapsulate the compressed media signal, output the encapsulated compressed media signal to the primary talker within the media conference, determine whether the compressed media signal has been generated for previously, save the compressed media signal if not previously generated for; and discard the compressed media signal if previously generated for.

54. A conference bridge according to claim 50 further comprising an output unit coupled to the energy detection and talker selection unit that operates, for each of the received compressed media signals, to:
   determine whether the compressed media signal corresponds to the secondary talker within the media conference; and
   if determined that the compressed media signal corresponds to the secondary talker, encapsulate the compressed media signal, output the encapsulated compressed media signal to the primary talker within the media conference, determine whether the compressed media signal has been generated for previously; if not previously generated for, decompress the compressed media signal, resulting in a secondary media signal, and save the secondary media signal; and discard the compressed media signal if previously generated for.

55. A conference bridge according to claim 50 further comprising an output unit coupled to the energy detection and talker selection unit that operates, for each of the received compressed media signals, to:
   determine whether the compressed media signal corresponds to the primary talker within the media conference; and
   if determined that the compressed media signal corresponds to the primary talker, encapsulate the compressed media signal; output the encapsulated compressed media signal to the secondary talker within the media conference; decompress the compressed media signal, resulting in a primary media signal; determine whether a corresponding secondary media signal is saved; if a corresponding secondary media signal is not saved, generate a secondary media signal; mix the primary and secondary media signals into a single combined media signal; encapsulate the combined media signal; and output the encapsulated combined media signal to the sources within the media conference except the primary and secondary talkers.

56. A conference bridge according to claim 55, wherein the output unit further operates to decompress the secondary media signal prior to mixing it with the primary media signal if the secondary media signal is saved only in compressed form.

57. A conference bridge according to claim 50 further comprising an output unit coupled to the energy detection and talker selection unit that operates, for each of the received compressed media signals, to:
   determine whether the compressed media signal corresponds to the primary talker within the media conference; and
   if determined that the compressed media signal corresponds to the primary talker, encapsulate the compressed media signal; output the encapsulated compressed media signal to the secondary talker within the media conference; decompress the compressed media signal, resulting in a primary media signal; determine whether a corresponding secondary media signal is saved; if a corresponding secondary media signal is not saved, monitor for receipt of a media data packet from the secondary talker for a predetermined time period; if the predetermined time period expires and no media data packet corresponding to the secondary talker has been received, generate a secondary media signal; mix the primary and secondary media signals into a single combined media signal; encapsulate the combined media signal; and output the encapsulated combined media signal to the sources within the media conference except the primary and secondary talkers.

58. A conference bridge according to claim 50 further comprising an output unit coupled to the energy detection and talker selection unit that operates, for each of the received compressed media signals, to:
   determine whether the compressed media signal corresponds to the primary talker within the media conference; and
   if determined that the compressed media signal corresponds to the primary talker, encapsulate the compressed media signal; output the encapsulated compressed media signal to the secondary talker within the media conference; determine whether a corresponding compressed media signal associated with the secondary talker is saved; if a corresponding compressed media signal associated with the secondary talker is not saved, generate a compressed media signal for the secondary talker; encapsulate the compressed media signals corresponding to the primary and secondary talkers into a combined media data packet; and output the combined media data packet to the sources within the media conference except the primary and secondary talkers.

59. A conference bridge according to claim 50 further comprising an output unit coupled to the energy detection and talker selection unit that operates, for each of the received compressed media signals, to:
  determine whether the compressed media signal corresponds to the primary talker within the media conference; and
  if determined that the compressed media signal corresponds to the primary talker, encapsulate the compressed media signal; output the encapsulated compressed media signal to the secondary talker within the media conference; determine whether a corresponding compressed media signal associated with the secondary talker is saved; if a corresponding compressed media signal associated with the secondary talker is not saved, monitor for receipt of a media data packet from the secondary talker for a predetermined time period; if the predetermined time period expires and no media data packet corresponding to the secondary talker has been received, generate a compressed media signal for the secondary talker; encapsulate the compressed media signals corresponding to the primary and secondary talkers into a combined media data packet; and output the combined media data packet to the sources within the media conference except the primary and secondary talkers.

60. A packet-based network comprising a conference bridge and a plurality of packet-based terminals;
  wherein at least two of the plurality of packet-based terminals operates to output media data packets comprising compressed media signals, these packet-based terminals together forming a media conference;
  wherein the conference bridge operates to receive the media data packets from the packet-based terminals within the media conference; to process the compressed media signals corresponding to the received media data packets including selecting a set of the packet-based terminals within the media conference as talkers; and to output media data packets that correspond to the compressed media signals received from the talkers; and
  wherein at least one of the packet-based terminals within the media conference further operates to receive the media data packets output from the conference bridge and to process these received media data packets including performing a jitter buffering operation, the jitter buffering operations being performed within the packet-based terminals only.

61. A network comprising a packet-based network, a conference bridge coupled to the packet-based network, a non-packet-based telephone network, at least one packet-based apparatus coupled between the packet-based network and the non-packet-based telephone network, and a plurality of sources for media signals that are each coupled to the non-packet-based telephone network;
  wherein the conference bridge comprises conferencing control logic to receive at least one media data packet from at least two of the sources forming a media conference, each media data packet defining a compressed media signal; to process the received compressed media signals including selecting a set of the sources within the media conference as talkers; and to output media data packets that correspond to the compressed media signals received from the talkers; and
  wherein at least one of the packet-based apparatus operates to receive the media data packets output from the conference bridge and to process these received media data packets including performing a jitter buffering operation, the jitter buffering operations being performed within the packet-based apparatus only.

62. A method of processing compressed media signals within a media conference, the method comprising:
  receiving at least one compressed media packet from at least two sources forming the media conference, each media data packet defining a compressed media signal;
  processing the received compressed media signals including selecting a set of the sources within the media conference as talkers;
  outputting media data packets that correspond to compressed media signals received from the talkers;
  receiving the media data packets that correspond to compressed media signals received from the talkers at one or more packet-based apparatus; and
  processing the received compressed media signals including performing a first and only jitter buffering operation.

63. A method according to claim 62, wherein the one or more packet-based apparatus each comprise one of the sources forming the media conference.

64. A method according to claim 62, wherein the processing the received compressed media signals further includes a decompression operation which outputs uncompressed media signals corresponding to the received compressed media signals; and
  wherein the method further comprises forwarding the uncompressed media signals to at least one of the sources forming the media conference.

65. A conference bridge, comprising conferencing control logic to:
  receive at least one media data packet from at least two sources forming a media conference, each media data packet comprising a compressed media signal and packet overhead;
  remove the packet overhead;
  process the received compressed media signals including selecting a set of the sources within the media conference as talkers, one of the talkers being a lead talker; and
  output media data packets that correspond to compressed media signals received from the talkers; and
  wherein the media data packets corresponding to the lead talker are always output from the conference bridge in the same order as the media data packets which are received from the lead talker.

66. A conference bridge, comprising:
  means for receiving at least one media data packet from at least two sources forming a media conference, each media data packet comprising a compressed media signal and packet overhead;
  means for performing initial processing of the received media data packet comprising removing the packet overhead;
  means for processing the received compressed media signals including means for selecting a set of the sources within the media conference as talkers, one of the talkers being a lead talker; and means for outputting media data packets that correspond to the lead talker always in the same order as the media data packets which are received from the lead talker.

67. A packet-based apparatus, comprising:
a receiver capable of being coupled to a network, said receiver to receive a media data packet from a conference bridge, the media data packet defining two or more compressed media signals, and perform initial processing of the received media data packet comprising removing the packet overhead; and
an output unit coupled to the receiver to decompress each of the compressed media signals in order to generate corresponding uncompressed media signals, mix the uncompressed media signals into a combined media signal, and output the combined media signal.

68. A packet-based apparatus according to claim 67, wherein the media data packet is an audio data packet and the compressed media signals within the media data packet are compressed audio signals.

69. A packet-based apparatus according to claim 67, wherein to perform initial processing of the received media data packet, the receiver further comprises buffering each of the compressed media signals for jitter after the removing of the packet overhead from the received media data packet.

70. A packet-based apparatus according to claim 67, wherein the output unit operates further to buffer each of the uncompressed media signals for jitter prior to the mixing of the signals.

71. A packet-based apparatus according to claim 67, wherein the receiver operates further to receive a second media data packet from the conference bridge, the second media data packet defining a single compressed media signal, and perform initial processing of the received second media data packet comprising removing the packet overhead; and
wherein the output unit operates further to decompress the single compressed media signal in order to generate a single uncompressed media signal and output the single uncompressed media signal.

72. A packet-based apparatus according to claim 67 further comprising a speaker coupled to the output unit to receive the combined media signal and broadcast audio signals corresponding to the received combined media signal.

73. A packet-based network interface comprising a packet-based apparatus according to claim 67, wherein the combined media signal is arranged to be output, via a non-packet-based network, to a non-packet-based telephone terminal.

74. A packet-based apparatus, comprising control logic to:
receive a media data packet from a conference bridge, the media data defining two or more compressed media signals;
perform initial processing of the received media data packet comprising removing the packet overhead;
decompress each of the compressed media signals in order to generate corresponding uncompressed media signals;
mix the uncompressed media signals into a combined media signal; and
output the combined media signal.

75. A packet-based apparatus, comprising:
means for receiving a media data packet from a conference bridge, the media data defining two or more compressed media signals;
means for performing initial processing of the received media data packet comprising removing the packet overhead;
means for decompressing each of the compressed media signals in order to generate corresponding uncompressed media signals;
means for mixing the uncompressed media signals into a combined media signal; and
means for outputting the combined media signal.

76. A method of outputting a combined media signal comprising:
receiving a media data packet from a conference bridge, the media data packet defining two or more compressed media signals;
performing initial processing of the received media data packet comprising removing the packet overhead;
decompressing each of the compressed media signals in order to generate corresponding uncompressed media signals;
mixing the uncompressed media signals into a combined media signal; and
outputting the combined media signal.

77. A packet-based apparatus, comprising:
a receiver capable of being coupled to a network, said receiver to receive a media data packet from a conference bridge, the media data packet defining a compressed media signal, and perform initial processing of the received media data packet comprising removing the packet overhead; and
an output unit coupled to the receiver to decompress the compressed media signal in order to generate a first uncompressed media signal, identify at least one other uncompressed media signal that corresponds to the first uncompressed media signal, mix the first uncompressed media signal with the other uncompressed media signal into a combined media signal, and output the combined media signal.

78. A packet-based apparatus according to claim 77, wherein the media data packet is an audio data packet and the compressed media signal within the media data packet is a compressed audio signal.

79. A packet-based apparatus according to claim 77, wherein to perform initial processing of the received media data packet, the receiver further comprises buffering the compressed media signal for jitter after the removing of the packet overhead from the received media data packet.

80. A packet-based apparatus according to claim 77, wherein the output unit operates further to buffer the uncompressed media signal for jitter prior to the mixing of the signals.

81. A packet-based apparatus according to claim 77, wherein the receiver operates further to receive a second media data packet from the conference bridge, the second media data packet defining a second compressed media signal, and perform initial processing of the received second media data packet comprising removing the packet overhead; and
wherein the output unit operates further to decompress the second compressed media signal in order to generate a second uncompressed media signal and output the second uncompressed media signal.

82. A packet-based apparatus according to claim 77, wherein to identify at least one other uncompressed media signal that corresponds to the first uncompressed media signal, the output unit operates further to determine a first identification item within the packet overhead of the received media data packet and locate at least one other uncompressed media signal that corresponds to a received media data packet comprising a second identification item that relates to the first identification item.

83. A packet-based terminal according to claim 82, wherein the first and second identification items comprise time stamps.

84. A packet-based apparatus according to claim 77 further comprising a speaker coupled to the output unit to receive the combined media signal and broadcast audio signals corresponding to the received combined media signal.

85. A packet-based network interface comprising a packet-based apparatus according to claim 77, wherein the combined media signal is arranged to be output, via a non-packet-based network, to a non-packet-based telephone terminal.

86. A packet-based apparatus, comprising control logic to:
receive a media data packet from a conference bridge, the media data packet defining a compressed media signal;
perform initial processing of the received media data packet comprising removing the packet overhead;
decompress the compressed media signal in order to generate a first uncompressed media signal;
identify at least one other uncompressed media signal that corresponds to the first uncompressed media signal;
mix the first uncompressed media signal with the other uncompressed media signal into a combined media signal; and
output the combined media signal.

87. A packet-based apparatus, comprising:
means for receiving a media data packet from a conference bridge, the media data packet defining a compressed media signal;
means for performing initial processing of the received media data packet comprising removing the packet overhead;
means for decompressing the compressed media signal in order to generate a first uncompressed media signal;
means for identifying at least one other uncompressed media signal that corresponds to the first uncompressed media signal;
means for mixing the first uncompressed media signal with the other uncompressed media signal into a combined media signal; and
means for outputting the combined media signal.

88. A method of outputting a combined media signal comprising:
receiving a media data packet from a conference bridge, the media data packet defining a compressed media signal;
performing initial processing of the received media data packet comprising removing the packet overhead;
decompressing the compressed media signal in order to generate a first uncompressed media signal;
identifying at least one other uncompressed media signal that corresponds to the first uncompressed media signal;
means for mixing the first uncompressed media signal with the other uncompressed media signal into a combined media signal; and
outputting the combined media signal.

89. A conference bridge, comprising:
a receiver capable of being coupled to a network to receive at least one first media data packet from at least one source within a media conference, each first media data packet comprising a first compressed media signal and packet overhead, and receive at least one second media data packet from at least one other conference bridge, each second media data packet comprising at least one second compressed media signal and packet overhead corresponding to a particular source within the media conference, wherein the receiver removes the packet overhead of the at least one first media data packet and the at least one second media data packet; and
an energy detection and talker selection unit coupled to the receiver to select a set of the sources within the media conference as talkers based upon the compressed media signals within both the first and second media data packets.

90. A conference bridge according to claim 89, wherein the first and second media data packets are audio data packets and the compressed media signals within the first and second media data packets are compressed audio signals.

91. A conference bridge according to claim 89, wherein each of the second media data packets comprises a single compressed media signal, the compressed media signal corresponding to one of a lone talker, a primary talker and a secondary talker selected by the other conference bridge in which the particular media data packet was received from.

92. A conference bridge according to claim 89, wherein each of the second media data packets comprises at least two compressed media signals, the compressed media signals corresponding to at least a primary talker and a secondary talker selected by the other conference bridge in which the particular media data packet was received from.

93. A conference bridge according to claim 89 further comprising an output unit coupled to the energy detection and talker selection unit to encapsulate compressed media signals corresponding to the selected talkers and output these encapsulated compressed media signals to the source that the conference bridge receives the first media data packet unless the particular source is selected as a talker.

94. A conference bridge according to claim 89 further comprising an output unit coupled to the energy detection and talker selection unit to encapsulate compressed media signals corresponding to the selected talkers and output these encapsulated compressed media signals to the at least one other conference bridge.

95. A conference bridge according to claim 89 further comprising an output unit coupled to the energy detection and talker selection unit to encapsulate compressed media signals corresponding to the selected talkers and output these encapsulated compressed media signals to the at least one other conference bridge unless the particular compressed media signals were received from the at least one other conference bridge prior to receiving the signals from another source.

96. A conference bridge according to claim 89, wherein to select a set of the sources within the media conference as talkers, the energy detection and talker selection unit operates to determine at least one speech parameter corresponding to each of the first and second compressed media signals and select a set of the sources within the media conference as talkers based on the determined speech parameters.

97. A conference bridge, comprising:
a receiver capable of being coupled to a network to receive at least one media data packet from at least one other conference bridge, each media data packet comprising at least one compressed media signal and packet overhead corresponding to a particular source within a media conference, wherein the receiver removes the packet overhead of the at least one media data packet; and an energy detection and talker selection unit coupled to the receiver to select a set of the sources within the media conference as talkers based upon the compressed media signals within both the media data packets.

98. A conference bridge, comprising conferencing control logic to:

receive at least one first media data packet from at least one source within a media conference, each first media data packet comprising at least one first compressed media signal and packet overhead;

remove the packet overhead of the at least one first media data packet;

receive at least one second media data packet from at least one other conference bridge, each second media data packet comprising at least one second compressed media signal and packet overhead corresponding to a particular source within the media conference;

remove the packet overhead of the at least one second media data packet; and select a set of the sources within the media conference as talkers based upon the compressed media signals within both the first and second media data packets.

99. A method for selecting a set of talkers within a media conference, comprising:

receiving at least one first media data packet from at least one source within a media conference, each first media data packet comprising at least one first compressed media signal and packet overhead;

removing the packet overhead of the at least one first media data packet;

receiving at least one second media data packet from at least one other conference bridge, each second media data packet comprising at least one second compressed media signal and packet overhead corresponding to a particular source within the media conference;

removing the packet overhead of the at least one second media data packet; and selecting a set of the sources within the media conference as talkers based upon the compressed media signals within both the first and second media data packets.

100. A packet-based apparatus, comprising:

a receiver capable of being coupled to a network to receive at least one first media data packet from a first source within a media conference, each first media data packet defining at least one first compressed media signal; receive at least one second media data packet from a second source within the media conference, each second media data packet defining at least one second compressed media signal; and perform initial processing of the at least one received first and second media data packets comprising removing the packet overhead; and an output unit coupled to the receiver to decompress each of the first and second compressed media signals in order to generate corresponding first and second uncompressed media signals, mix the first and second uncompressed media signals into a combined media signal, and output the combined media signal.

* * * * *